United States Patent [19]

Saburi

[11] Patent Number: 4,905,235
[45] Date of Patent: Feb. 27, 1990

[54] TDMA SYSTEM CAPABLE OF INDIVIDUALLY CONTROLLING ELECTRIC POWER OF BURSTS

[75] Inventor: Akio Saburi, Tokyo, Japan

[73] Assignee: NEC Corporation, Japan

[21] Appl. No.: 145,114

[22] Filed: Jan. 19, 1988

[30] Foreign Application Priority Data

Jan. 16, 1987 [JP] Japan .................................. 62-5908
Jan. 16, 1987 [JP] Japan .................................. 62-5909
Jan. 16, 1987 [JP] Japan .................................. 62-5910
Jan. 16, 1987 [JP] Japan .................................. 62-5911

[51] Int. Cl.$^4$ ............................................. H04J 3/16
[52] U.S. Cl. ..................................... 370/95.3; 455/10
[58] Field of Search ......................... 370/95, 104, 107; 375/1, 115; 455/10, 12, 69

[56] References Cited

U.S. PATENT DOCUMENTS 4,301,533 11/1981 Acampora et al. ................... 455/10
4,495,648 1/1985 Giger .................................... 455/10

*Primary Examiner*—Joseph A. Orsino, Jr.
*Assistant Examiner*—Frank M. Scutch, III
*Attorney, Agent, or Firm*—Ostrolenk, Faber, Gerb & Soffen

[57] ABSTRACT

In a TDMA system comprising a plurality of earth stations communicable with one another by the use of a plurality of carrier waves through a transponder of a satellite which has an available electric power level, bursts carried by the carrier waves are individually and flexibly controlled in accordance with a burst time plan so that selected ones of the carrier waves have on the satellite a total electric power level which does not exceed the available electric power level at any time. The bursts therefore may have different power levels in dependency upon scales of the earth stations, traffics carried by the bursts, and receiving conditions at the earth conditions. The selected carrier waves can be transmitted or received by frequency hopping. Such control of the power level is carried out in each earth station by the use of a combination of an attenuator (67) and an attenuation control circuit (71) operated in accordance with the burst time plan.

18 Claims, 14 Drawing Sheets

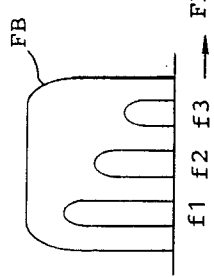
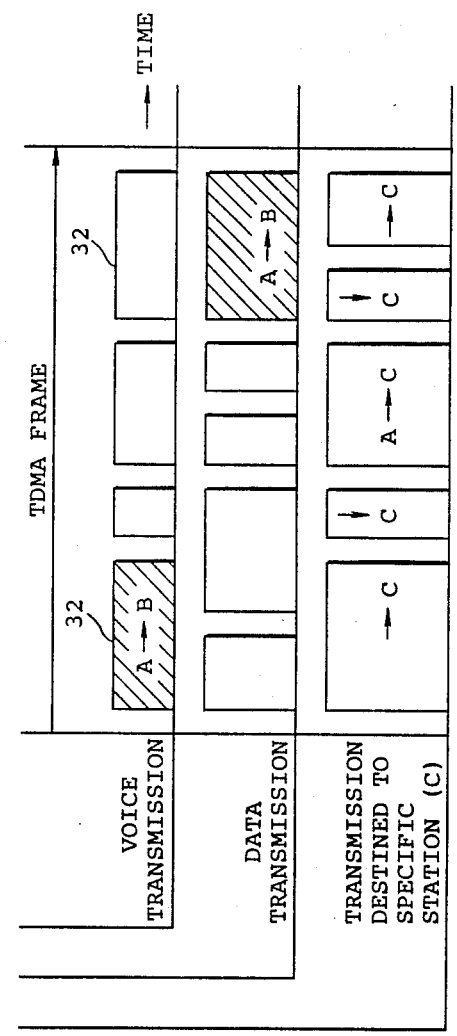
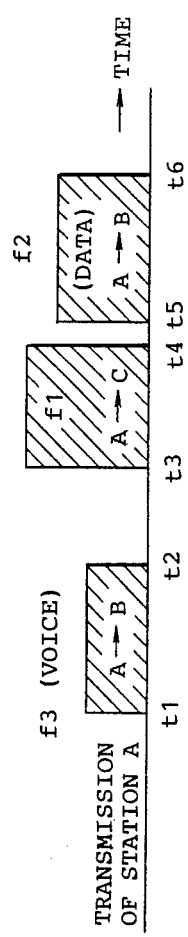
FIG. 4(a)
FIG. 4(b)

TDMA SYSTEM CAPABLE OF INDIVIDUALLY CONTROLLING ELECTRIC POWER OF BURSTS

BACKGROUND OF THE INVENTION

This invention relates to a time division multiple access (TDMA) system for use in carrying out communication among a plurality of earth stations through a satellite. It should be noted throughout the instant specification that the time division multiple access system is especially suitable for business satellite communication.

The satellite communication has been formerly used only in international communication. However, recent technical development enables a reduction of costs for the satellite communication and also application of the satellite communication not only to local public communication but also to so-called private business communication used in private companies.

In business communication, a wide variety of traffic, such as an image signal, a data signal, or an audio signal, must be transmitted among earth stations through a satellite and must be systematically and collectively dealt with in the form of a succession of digital signals. In addition, each earth station for the business communication is usually located in the vicinity of users, for example, on roofs of buildings of the users. In this connection, a high frequency band, such as 14/11 GHz (Ku band), 30/20 GHz (Ka band), is used to avoid an adverse influence or interference on the other microwave network systems which have already been set up.

As a general satellite communication system conveying a succession of digital signals, a Single Channel per Carrier (SCPC) system has been proposed which uses a single carrier wave at every unit channel of, for example, 64 kbps. However, the SCPC system is disadvantageous in that a maximum transmission capacity per channel is inevitably restricted to 64 kbps.

Alternatively, another proposal has also been proposed as regards a Multiple Channel per Carrier (MCPC) system which uses a single carrier wave after carrying a multiplexed signal of, for example, 1.5 Mbps, 2.0 Mbps, or the like assigned to a plurality of channels are multiplexed into a multiplexed signal of, for example, 1.5 Mbps, 2.0 Mbps, or the like. However, actual transmission traffic does not always reach 1.5 Mbps or 2.0 Mbps at each earth station. Therefore, the carrier wave may wastefully be used in each earth station.

At any rate, both the SCPC and the MCPC systems have a poor flexibility in order to systematically and collectively deal with various kinds of digital signals. This shows that the SCPC and the MCPC systems are unsuitable for the business communication mentioned before.

An improved time division multiple access system has been proposed in order to solve the above-mentioned disadvantages and shortcomings and to systematically and effectively deal with the digital signals.

In an article contributed by John E. Ohlson et al to ICC's 83 (June 19–22, 1983), and entitled "Multi-Frequency TDMA for Satellite Communications," a plurality of carrier waves can be used in a sole transponder assigned to a plurality of terminals and are time-shared by the terminals. With this structure, each terminal can transmit bursts of data at a multiplicity of time and frequency slots on a time-frequency map.

Moreover, data burst synchronization is performed without the use of a preamble. In this connection, such Multi-Frequency TDMA will be called a specific MFTDMA hereinunder. In the specific MFTDMA, demand assigned multiple access (DAMA) is readily implemented with a high frame efficiency.

The carriers in the transponder can be operated with different power levels so that high fading margins can be provided by circuit reallocation. Therefore, effective utilization of electric power is possible by controlling the power levels so as to assign a high power level to a certain one of the earth stations that receives a signal subjected to heavy attenuation.

However, the article of Ohlson et al is restricted only to the specific MFTDA. In other words, no consideration is paid to effective utilization of electric power in usual TDMA which is operated under control of a burst time plan.

The Ohlson et al article also teaches to vary power levels of the carriers in consideration of scales of earth stations and weather at each earth station in order to effectively use the electric power. However, the Ohlson et al article does not teach how to specifically vary the power levels of the respective carriers and does not even remotely suggest the necessity of varying the power levels in accordance with transmission quality requirements of respective data rates or traffic to be transmitted.

SUMMARY OF THE INVENTION

It is an object of this invention to provide a time division multiple access (TDMA) system which is different from a specific MFTDMA mentioned above and which can accomplish effective utilization of electric power.

It is another object of this invention to provide a TDMA system of the type described, which is capable of flexibly varying the electric power.

It is still another object of this invention to provide a TDMA system of the type described, wherein power levels can be changed at each of bursts in consideration of scales of earth stations and weather at each earth station.

It is yet another object of this invention to provide a TDMA system of the type described, which can vary power levels in consideration of transmission quality requirements of respective data rates or traffic to be used between the earth stations.

According to an aspect of this invention, there is provided a method of carrying out communication among a plurality of earth stations in accordance with a burst time plan through a satellite which comprises a transponder operable in response to a first predetermined number of different carrier waves, N in number, where N is a natural number greater than unity. The method comprises the step of determining a first total electric power level available for the first predetermined number of the carrier waves, selecting a second predetermined number of the carrier waves, M in number, as selected carrier waves from the first predetermined number of the carrier waves in accordance with the burst time plan. The second predetermined number is not greater than the first predetermined number. The method further comprises the step of individually and flexibly controlling the selected carrier waves in accordance with the burst time plan so that the selected carrier waves have a second total electric power level which does not exceed the first total electric power level.

According to another aspect of this invention, there is provided a time division multiple access system comprising a plurality of earth stations communicable with one another in accordance with a burst time plan through a satellite which comprises a transponder operable in response to a first predetermined number of carrier waves, N in number, where N is a natural number greater than unity. The transponder has a first total electric power level available for the first predetermined number of the carrier waves. In the system, a second predetermined number of the carrier waves, M in number, are selected as selected carrier waves from the carrier waves of the first predetermined number in accordance with the burst time plan so that the selected carrier waves have a second total electric power level which does not exceed the first total electric power level in the transponder.

BRIEF DESCRIPTION OF THE DRAWING

FIGS. 4(a) and 4(b) are time charts for use in describing a principle of this invention;

DESCRIPTION OF THE PREFERRED EMBODIMENTS

Figure 1:
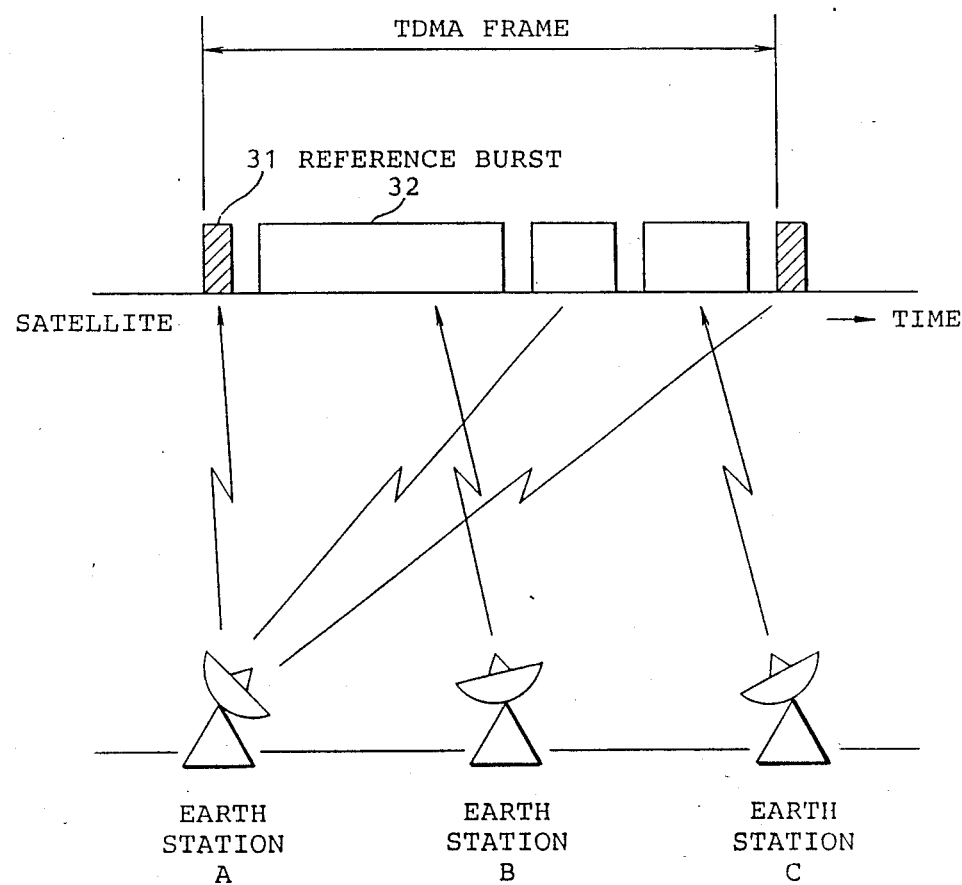
FIG. 1 is a diagrammatical view for use in describing a principle of time division multiple access system.

Referring to FIG. 1, description will be made as regards a principle of a time division multiple access (TDMA) system for a better understanding of this invention. It is to be noted here that the illustrated TDMA system is different from the specific MFTDMA described above according to the Ohlson et al article. For brevity of description, only three earth stations A, B, and C are illustrated in the figure and will be called first, second, and third stations, respectively. It will be assumed that the first station A acts as a reference station for periodically transmitting a reference burst 31 towards a satellite (symbolically indicated by a horizontal line) to define a time division multiple access (TDMA) frame on the satellite. Thus, the reference burst 31 serves to provide a reference timing or time instant on the satellite. The satellite comprises at least one repeater. Such a repeater may be referred to as a transponder.

Each of the first through the third stations A to C detects the reference timing from the reference burst received through the satellite and transmits a data burst 32 during a time interval preassigned to each earth station relative to the reference timing. The data burst 32 conveys traffic which may be an image, sound, and/or data produced at each earth station. Thus, the transponder on board the satellite is used in common to the first through third stations A to C in a time division fashion.

In the illustrated TDMA system, a single carrier wave of a preselected frequency is assumed to be common to all of the earth stations to transmit various kinds of signals, such as a sound signal, an image signal, and a data signal. This shows that all of the signals can be received by a single receiver at each earth station. The TDMA system is therefore very advantageous in that each earth station has a transmission capacity which can flexibly be changed with time. In addition, a transmission burst length can be also favorably changed at each earth station. Moreover, no strict restriction is imposed on each channel of the TDMA system.

More specifically, a set of control data signals is produced in each earth station of the TDMA system in accordance with a burst time plan in order to specify, in the TDMA frame, a location and a width of each transmission burst and a destined address of each traffic. Likewise, a reception burst and its processing procedure are also specified by another set of control data signals in accordance with the burst time plan. In order to memorize the burst time plan, a memory circuit (later illustrated) is prepared in each earth station in the form of control data signal sets.

With this system, a new burst time plan can be substituted for a previous burst time plan, for example, by sending new control data signals of the new burst time plan from the reference station to the satellite, by loading each memory circuit with the new control data signals through the satellite to each earth station, and by simultaneously switching from the previous burst time plan to the new one. Therefore, it is possible to momentarily change the burst time plans from one to another without exerting any adverse influence on the traffic which is in the course of transmission. This shows that a network can be always kept in an optimum state by voluntarily forming a pertinent burst time plan in consideration of a variation of an amount or demand of traffic in the network and a variation of the other conditions and by dispatching the pertinent burst time plan to the earth stations.

Such a TDMA system using a burst time plan is well known by a TDMA system of Intelsat which has come into effect from Autumn, 1985, in connection with an international satellite communication system.

The TDMA system is inherently operative by using a single carrier wave in a single transponder of the satellite and by using total available electric power and an entire frequency band of the transponder. Under the circumstances, the available electric power of the transponder is most effectively utilized in the TDMA system in comparison with the other systems. With the TDMA system, it is possible to accomplish an available transmission capacity between 60 Mbps and 120 Mbps. This shows that the transponder has an available frequency band for the available transmission capacity.

Herein, it is to be noted that each earth station momentarily occupies an entire frequency band and the whole electric power of the transponder in a time division fashion. Accordingly, each earth station must have ability to be matched with the transponder and must therefore be large in electric power and size. Hence, the TDMA system is suitable for transmission of a large bundle of traffic among a comparatively small number of earth stations.

As regards a business communication system, consideration should be made as regards the fact that each earth station has a transmission capacity which is restricted to the extent of several Mbps or so and is small as compared with the above-mentioned available transmission capacity. Taking this into account, an available frequency band for the transponder is divided into a plurality of partial frequency bands so as to locally use selected one or ones of the partial frequency bands at a low transmission rate between several Mbps and 20 Mbps and to form a TDMA system of a low transmission rate which will be referred to as a low rate TDMA system.

Such local use of the available frequency band might fail to effectively utilize the transponder on board the satellite. However, the earth stations can participate in the business communication system, if each earth station has a scale similar to that used either in the SCPC system or in the MCPC system. Additionally, such a low rate TDMA system can be flexibly formed by the use of a burst time plan and is therefore favorably applicable to business communication.

In the low rate TDMA system, frequency hopping may be used to increase an apparent transmission capacity in selected at least one or ones of the earth stations and to effectively utilize facilities of each earth station. Herein, it is assumed that the frequency hopping is carried out in the low rate TDMA system by selecting a plurality of carrier waves received by a single transponder and by switching the selected carrier waves from one to another within the TDMA frame.

Figure 2A:
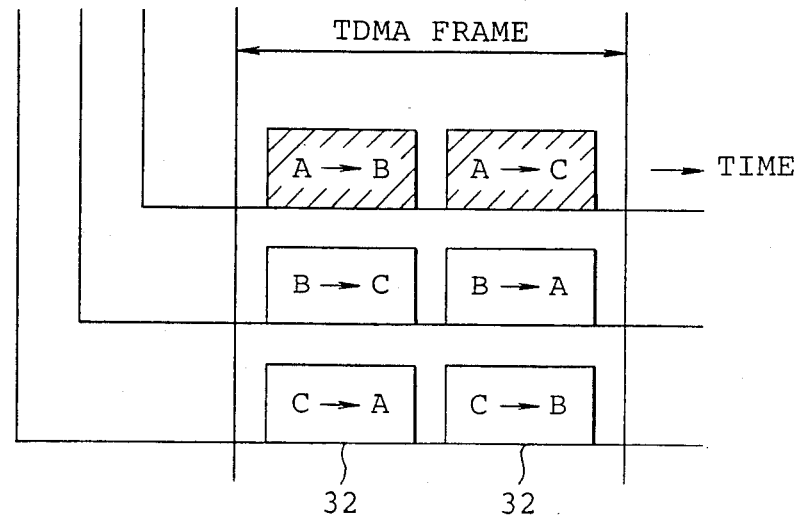
FIGS. 2(a) and 2(b) are time charts for use in describing frequency hopping operations of the time division multiple access system illustrated in FIG. 1.
Figure 2B:
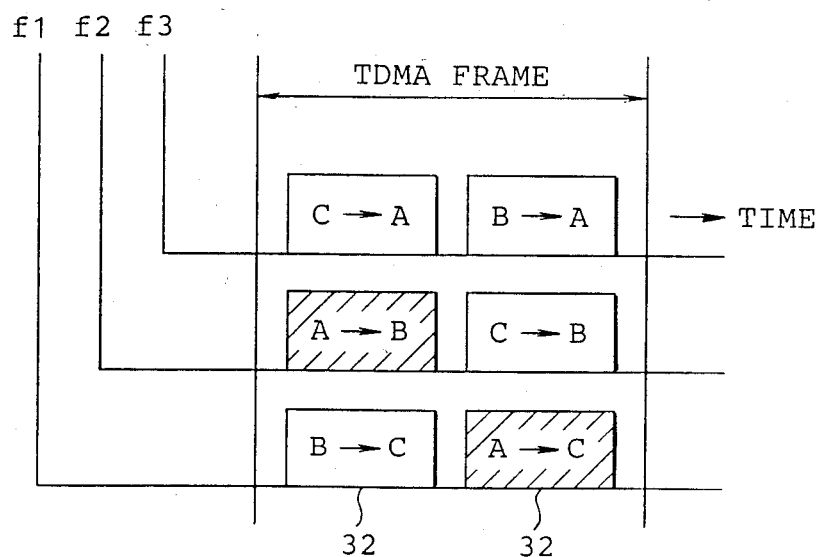

Referring to FIGS. 2(a) and 2(b) together with FIG. 1, the frequency hopping will be described on the assumption that a single transponder (not shown) on board the satellite is used in common to the first through third earth stations A to C (FIG. 1) and has a transponder frequency band FB. First, second, and third carrier waves are determined within the transponder frequency band FB and are depicted at $f_1$, $f_2$, and $f_3$, respectively. In the manner well known in the art, each earth station comprises a transmitting end and a receiving end so as to carry out the business communication.

For brevity of description, only one TDMA frame is illustrated in FIGS. 2(a) and 2(b). The data bursts 32 are arranged in the illustrated TDMA frame with the reference burst (omitted in FIGS. 2(a) and 2(b)). It is surmised that the individual data bursts 32 are destined or delivered to different ones of the first through third earth stations A to C in the manner indicated in the figures.

In FIG. 2(a), the first through third carrier waves $f_1$ to $f_3$ are assigned to the transmitting ends of the third, second, and first earth stations C, B, and A as transmission carrier waves, respectively. Specifically, the first earth station A can deliver the data bursts 32 to the second and the third earth stations B and C through the third carrier wave $f_3$, as shown by hatched portions, while the second and third earth stations B and C can deliver the data bursts 32 to the remaining earth stations through the second and first carrier waves $f_2$ and $f_1$, respectively.

The receiving ends of the first through third earth stations A to C switch reception carrier waves from one to another by the frequency hopping in a time division fashion to receive the data bursts 32 destined to them, respectively.

In FIG. 2(b), the first through third carrier waves $f_1$ to $f_3$ are received at the receiving ends of the third, second, and first earth stations C, B, and A as reception carrier waves, respectively. In this event, the transmitting ends of the first through third earth stations A to C carry out the frequency hopping to switch the first through third carrier waves $f_1$ to $f_3$ from one to another in the time division fashion. For example, the first earth station A selects the second carrier wave $f_2$ at the outset to deliver the data burst to the second earth station B and subsequently selects the first carrier wave $f_1$ to deliver the data burst to the third earth station C.

It is needless to say that a single earth station can carry out neither simultaneous transmission through two or more carrier waves nor simultaneous reception through two or more carrier waves. Accordingly, the burst time plan must be formed so as to reasonably determine each time interval for the bursts of the earth stations and destinations of the respective bursts.

Although simplification is made in FIGS. 2(a) and 2(b), a practical system becomes more intricate because of presence of many earth stations and differences of the transmission capacities in the earth stations. In addition, the frequency hopping may be carried out on both the transmitting and the receiving ends of the earth stations.

At any rate, the transmission capacity of each earth station can be expanded near to a transmission capacity which can be achieved when the earth station in question carries out continuous transmission.

In the meanwhile, it is pointed out that algorithm of forming a burst time plan in a TDMA system using a plurality of carrier waves is known in the art, for example, according to an article which was contributed by William H. Wolfe to the 7th ICDSC (May 12-16, 1986) and which was entitled "THE DST-1100 TDMA SYSTEM."

As mentioned before, business communication can be implemented by the low rate TDMA system which uses a plurality of carrier waves. However, such a TDMA system is disadvantageous in that every one of participating earth stations must have a scale similar to one another. It is mentioned that the term "scale" covers sizes of antennas, output power levels of the transmitting ends, sensitivity of the receiving ends, and the like.

In connection with business communication, consideration should be had about processing various kinds of signals, such as an audio signal, a data signal, which are different in bit error rate requirement from one another. More specifically, the sound or audio signal may have the bit error rate of $10^{-4}$ or so while the data signal should have the bit error rate equal to or more excellent than $10^{-8}$ because the data signal is subjected to band compression to reduce redundancy. This shows that high quality transmission must be carried out as for the data signal by adding an error correcting code. However, such high quality transmission is unnecessary for the sound signal. Under the circumstances, it is preferable to distinguish between the sound signal and the data signal, if possible.

As regards business communication, use of the Ka and the Ku bands offers a difficult problem such that serious attenuation is liable to occur in such frequency bands.

Figure 3:
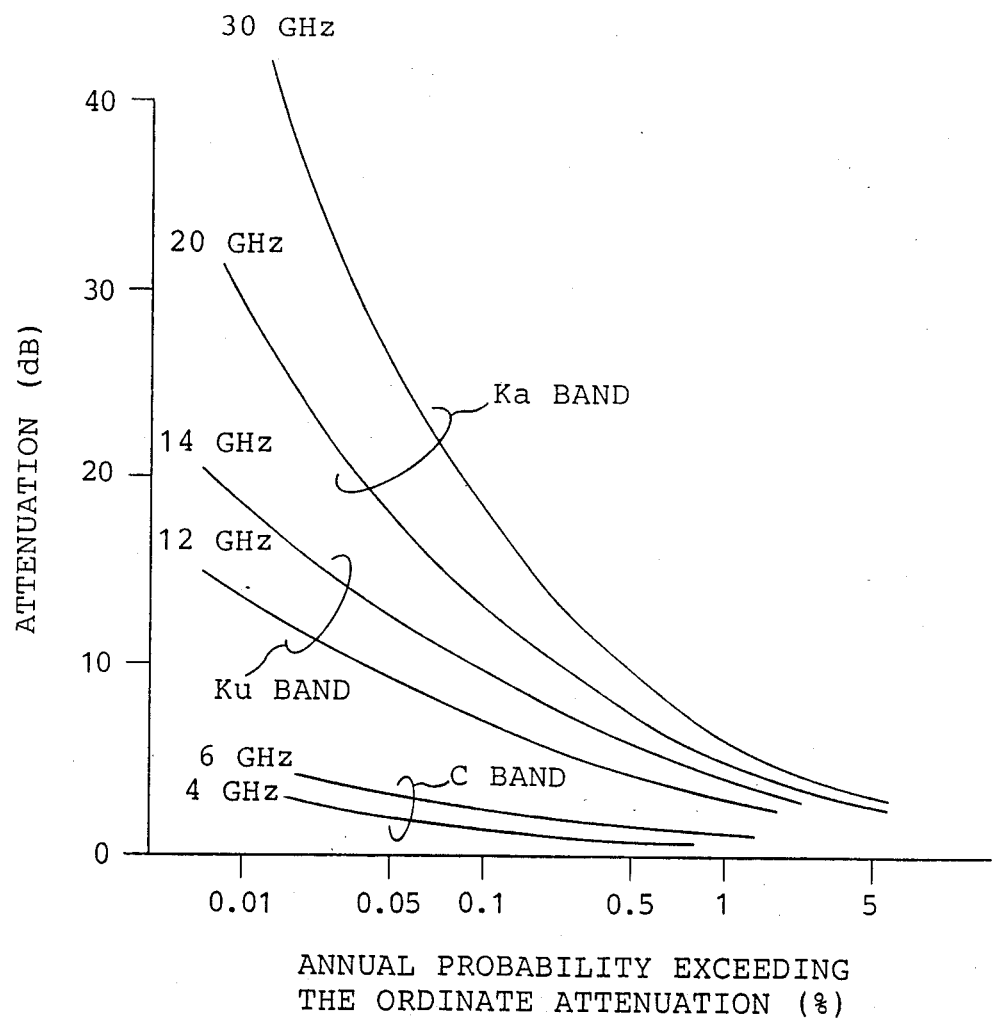
FIG. 3 is a graphical representation for use in describing annual probability of an attenuation due to rainfall in various carrier frequencies.

Referring to FIG. 3, wherein an ordinate and an abscissa represent attenuation on a scale of decibel (dB) and an annual probability (%) which exceeds the attenuation shown along the ordinate, a relationship between the attenuation and frequency bands will be described in order to specify the attenuation in the frequency bands for business communication. In FIG. 3, consideration is made about the C band (between 4 GHz and 6 GHz), the Ku band (between 12 GHz and 14 GHz), and the Ka band (between 20 GHz and 30 GHz). A pair of curves is illustrated for each of the C, Ku, and Ka bands. Each curve may be considered in relation to a rain loss of the signals. Specifically, the attenuation for the C band is represented by the curves of 4 GHz and 6 GHz while the attenuations for the Ku and the Ka bands are specified by the curves of 12 GHz and 16 GHz and the curves of 20 GHz and 30 GHz, respectively. It is to be noted that the C band has already been assigned to international satellite communication and terrestrial microwave relay systems and can not be used in business communication, although the rain loss is very low in the C level.

On the other hand, each of the Ku and Ka bands assigned to the business communication has a heavy rain loss in comparison with the C band.

In order to avoid such a heavy rain loss, space or site diversity may be considered which uses two earth stations distant from each other with a long distance of, for example, several tens of kilometers left therebetween. However, such site diversity is inconvenient for business communication because the business communication requires an earth station adjacent to each user.

Alternatively, it might be contemplated that transmission power is increased in earth station or stations to compensate for the rain loss and to keep an input signal level of a transponder invariable. This means that the above-mentioned compensation is carried out in connection with an up link from the earth stations towards the satellite and that no compensation for the rain loss is done in connection with a down link from the satellite towards the earth stations.

Furthermore, a margin of electric power may be given or afforded to earth stations in consideration of the rain loss on a link budget analysis. With this method, let the annual probability shown in FIG. 3 be reduced to 0.1% in the Ku band. In this case, the margin of electric power must be reached 10 dB, as understood from FIG. 3. This means that only one-tenth of available electric power is used on usual transmission. Accordingly, this method is very uneconomical.

Referring to FIGS. 4(a) and 4(b) together with FIG. 1, description will be diagrammatically made as regards a time division multiple access system according to a first embodiment of this invention on the assumption that a transponder on board a satellite is used in common to first through third earth stations A to C like in FIG. 1 and has a transponder frequency band FB. The transponder has an available electric power level of, for example, 5 watts or so. In addition, it is assumed that first through third carrier waves are defined within the transponder frequency band FB and have first, second, and third frequencies $f_1$, $f_2$, and $f_3$, respectively. In this connection, the first through the third carrier waves will be depicted at $f_1$, $f_2$, and $f_3$ hereinafter and serve to transmit traffic from each earth station to the satellite. The first through third carrier waves $f_1$ to $f_3$ may be called up link carrier waves or transmission carrier waves.

Furthermore, it is also assumed that the first earth station A comprises a transmitting end which can carry out frequency hopping while the third earth station C is operated on conditions different from the others. The third earth station C may be therefore called a specific station. Specifically, either the third earth station C may have a scale different from, namely, smaller than the first and the second earth stations A and B or the third earth station C is put into different reception states due to heavy rain or the like.

In the illustrated example, the third earth station C can receive data bursts destined thereto through a reception carrier wave corresponding to the first carrier wave $f_1$. This shows that the reception carrier wave is assigned to the third earth station C in the manner similar to that illustrated with reference to FIG. 2(b).

The second and the third carrier waves $f_2$ and $f_3$ illustrated in FIG. 4(a) are assigned to data transmission and voice or audio transmission, respectively. As mentioned before, high quality is required on the data transmission in comparison with the voice transmission.

From this fact, it is readily understood that the first carrier wave $f_1$ carries data bursts which are arranged within a TDMA frame and which are destined to the third earth station C while the second and the third carrier waves $f_2$ and $f_3$ convey data bursts produced on the data transmission and the voice transmission, respectively.

In FIG. 4(a), it is to be noted that the data bursts carried by the first carrier wave $f_1$ has a highest power level while the data bursts carried by the second carrier wave $f_2$ has a power level lower than the data bursts carried by the first carrier wave $f_1$ and higher than the data bursts carried by the third carrier wave $f_3$. This implies that the power levels of the first through third carrier waves are selected in consideration of traffics carried by the carrier waves. In this case, a sum of electric power levels of the first through third carrier waves $f_1$ to $f_3$ is selected so that the sum does not exceed the available electric power level determined in the transponder on board the satellite, for example, 5 watts as mentioned before at any time.

Herein, the available electric power level may be assumed to be determined for all of the first through third carrier waves A to C given to the single transponder and will be referred to as a first total electric power level given to a total number of the carrier waves. On the other hand, the first through third carrier waves $f_1$ to $f_3$ may be selectively interrupted now and then. Accordingly, the sum of the electric power level of the first through third carrier waves $f_1$ to $f_3$ may be varied with time and will be called a second total electric power level which is representative of a total electric power level of a selected one or ones of the first through third carrier waves $f_1$ to $f_3$.

In FIG. 4(b), the transmitting end of the first earth station A carries out the frequency hopping in the illustrated manner. More specifically, the first earth station A selects the third carrier wave $f_3$ in a time interval between time instants $t_1$ and $t_2$ to transmit a leading one of the data bursts that conveys voice delivered to the second earth station B. Subsequently, the first carrier wave $f_1$ is selected during the following time interval between time instants $t_3$ and $t_4$ to produce the following data burst delivered to the third earth station C. After selection of the first carrier wave $f_1$, the second carrier wave $f_2$ is selected during a time interval between time instants $t_5$ and $t_6$ to produce the data burst that conveys any data signal delivered to the second earth station B.

Each transmission power level of the data bursts is varied in each earth station at every one of the first through third carrier waves $f_1$ to $f_3$, as shown in FIG. 4(b), so that each burst is received by the transponder within the first total electric power level. Under the circumstances, it is understood that the second earth station B responds to reception carrier waves corresponding to the second and the third carrier waves $f_2$ and $f_3$ in a time division fashion.

At any rate, at least one of the earth stations may have a transmitting end which can carry out the frequency hopping when reception carrier waves are individually assigned to the respective earth stations and/or traffic and can be selected by the frequency hopping. This shows that, when frequency hopping is carried out in a plurality of earth stations (which may be called hopping stations) by selecting a plurality of carrier waves (which may be called hopping waves) one at a time, the number of the hopping stations should be determined in relation to the numbers of the hopping waves carried out in the respective hopping stations.

Thus, the first earth station A transmits various kinds of data bursts with different electric power levels by the use of different carrier waves. Such data bursts may be transmitted from the other earth stations. In this event, the electric power levels and the carrier waves should be favorably assigned and administrated in the illustrated TDMA system. A burst time plan can be accurately formed or designed to assign and administrate the electric power levels and the carrier waves of the data bursts.

Figure 5:
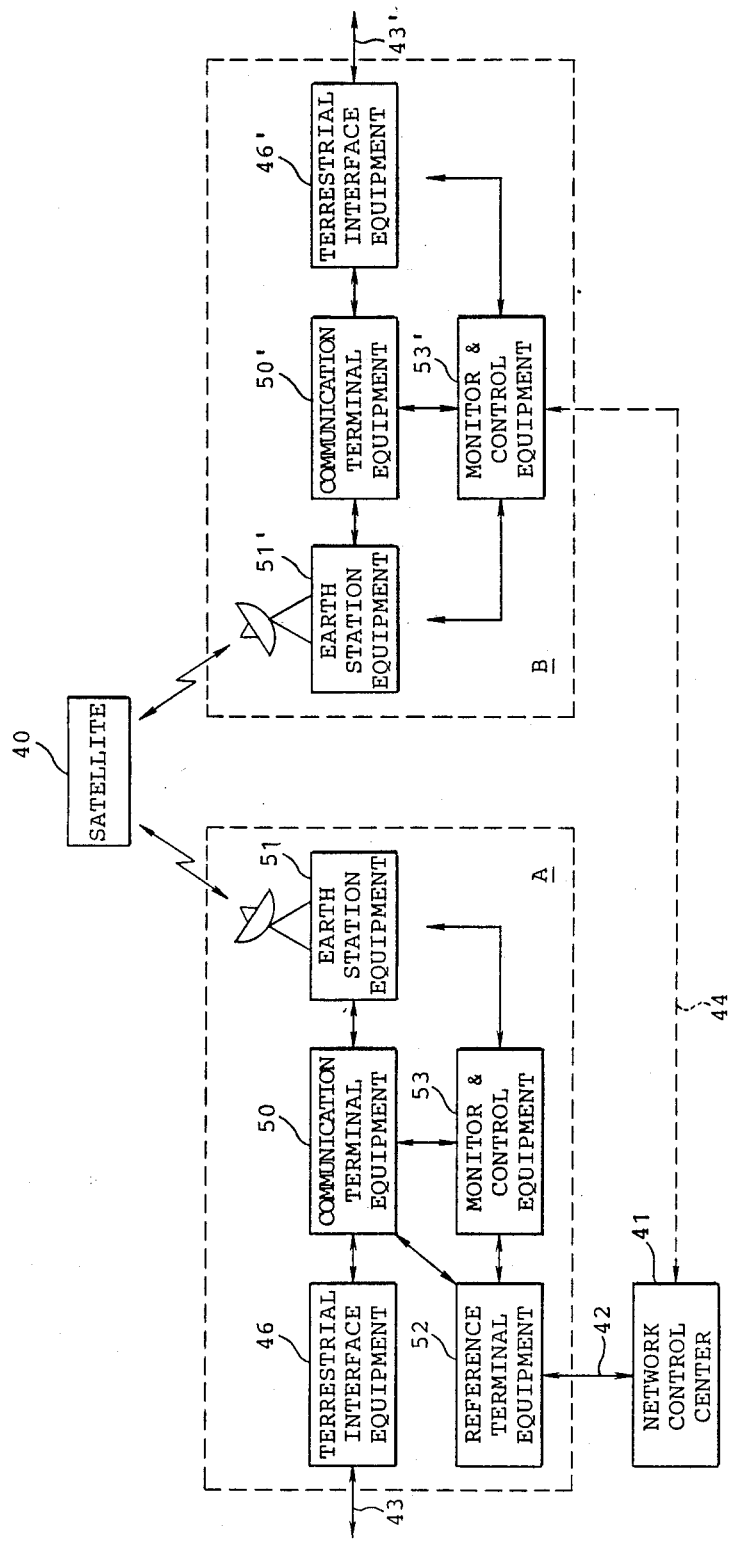
FIG. 5 is a block diagram of a time division multiple access system according to this invention.

Referring to FIG. 5, the TDMA system according to the first embodiment of this invention will be described in detail. In FIG. 5, only the first and the second earth stations A and B are illustrated as a representative of a large number of earth stations which use a single transponder of a satellite (depicted at 40 in FIG. 5) in common.

The first earth station A serves as a reference station in the illustrated system and is linked to a network control center 41 through a dedicated data link 42 and also to subscribers (not shown) through a terrestrial link 43.

The network control center 41 may be located within the reference station or distant from the reference station. The network control center 41 serves to monitor and control operation of the entirety of the TDMA system. The network control center 41 usually derives necessary information from the first earth station A through the dedicated data link 42. However, it is also possible to access the other earth station or stations through a public telephone line depicted at 44 and to collect any information through the public telephone line 44, if no information can be derived from the first earth station A.

In the illustrated network control center 41, a burst time plan is formed in a known manner in consideration of the scales of the earth stations, receiving or reception conditions of the earth stations, transmission qualities required for the traffic, and the like. The burst time plan may be formed for each of the participating earth stations or as a common data set including entire information associated with all participating earth stations. The burst time plan is sent through the reference station A to the satellite 40 and is thereafter delivered downwards to the participating earth stations each of which comprises a memory circuit (not shown in FIG. 5). As a result, the memory circuit of each earth station is loaded with the associated burst time plan.

The first earth station A which is operable as the reference station is supplied through the terrestrial link 43 with transmission traffic which is to be transmitted and which convey voice, image, and/or data signals. The transmission traffic is given through a terrestrial interface equipment 46 to a communication terminal equipment 50. The communication terminal equipment 50 transmits the transmission traffic to the satellite 40 through an earth station equipment 51 under control of a reference terminal equipment 52 and a monitor and a control equipment 53, as will later become clear as the description proceeds. Thus, the transmission traffic is carried by the transmission or up link carrier waves in accordance with the burst time plan in the manner illustrated in conjunction with FIG. 4.

Reception traffic is carried by reception or down link carrier waves and sent from the satellite 40 to the terrestrial link 43 through the earth station equipment 51, the communication terminal equipment 50, and the terrestrial interface equipment 46. Thus, the first earth station allows the traffic to pass therethrough bidirectionally, like any other earth station.

The reference terminal equipment 52 serves to operate the first earth station A as the reference station. In other words, additional operations are given to the first earth station A by the reference terminal equipment 52 in addition to normal operations necessary for the other earth stations. Specifically, the reference terminal equipment 52 is linked to the network control center 41 and acts as a front end processor in relation to the network control center 41. Such a front end processor serves not only to form and produce a reference burst but also to carry out reception of status information sent from each earth station and accumulation of data obtained by monitoring bursts given from each earth station. In addition, the illustrated reference terminal equipment 52 is operable to transfer the burst time plan to the monitor and control equipment 53.

The monitor and control equipment 53 comprises a mini computer and is operable to supervise states of operation of various elements in the first earth station A and states of channels or links. In addition, control and signal processing can be also carried out by the monitor and control equipment 53.

The second earth station B is similar in structure and operation to the first earth station A except that no reference terminal equipment is included in the second earth station B. In this situation, similar parts of the second earth station B are designated by combinations of like reference numerals and dashes, such as 43', 46', 50', 51', and 53', and will not be described any longer.

Figure 6:
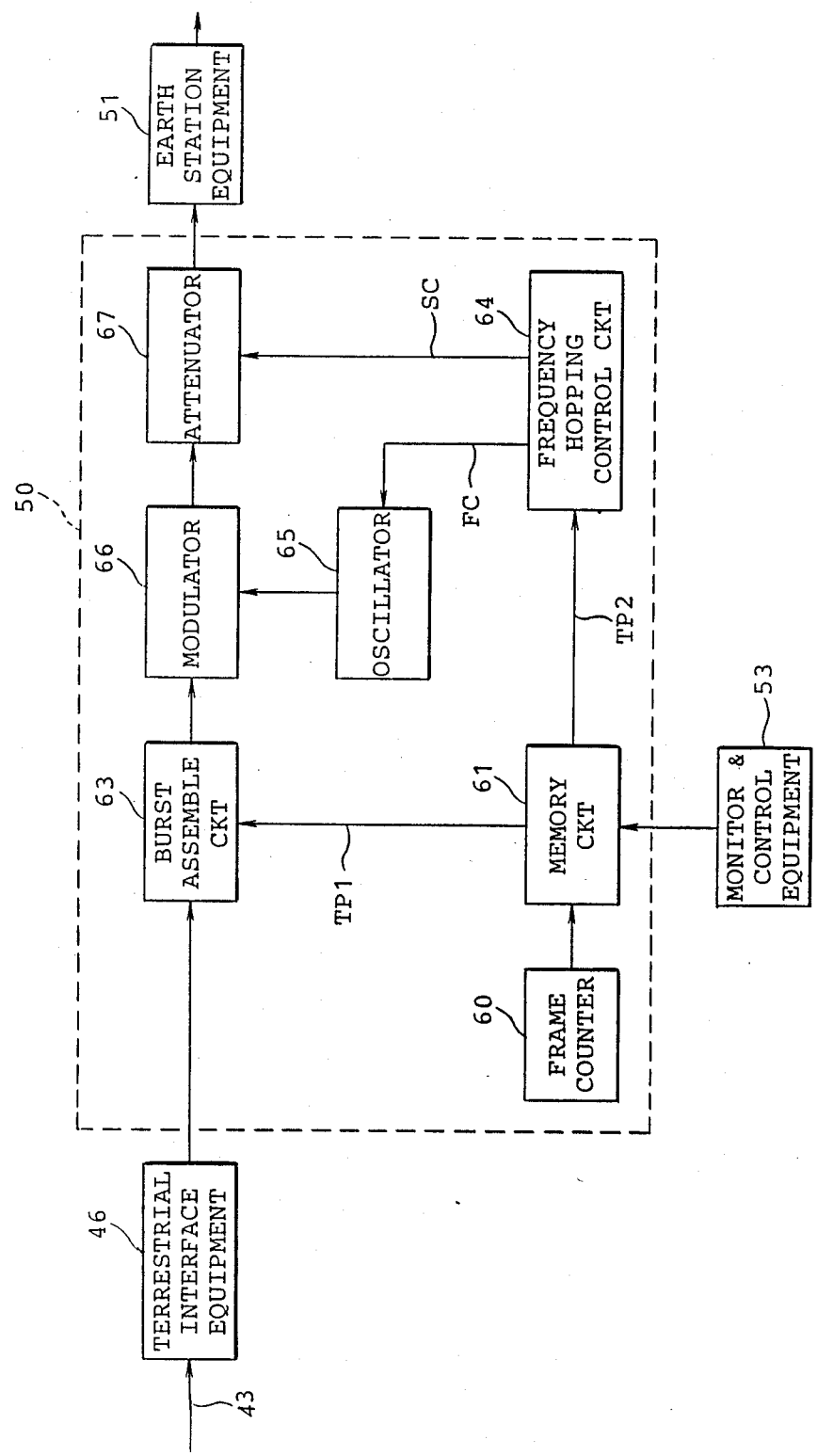
FIG. 6 is a block diagram of an earth station which is used in the time division multiple access system illustrated in FIG. 5 and which is operable in accordance with the principle illustrated with reference to FIGS. 4(a) and 4(b)

Referring to FIG. 6, the communication terminal equipment 50 will be described in detail in connection with the monitor and control equipment 53 and the terrestrial interface equipment 46. The illustrated communication terminal equipment 50 may be used either in the first earth station A or in the second earth station B and is operable as a transmission part or section. Let the communication terminal equipment 50 be supplied with the burst time plan from the reference station through the satellite 40, although the burst time plan may be directly supplied to the communication terminal equipment 50 in the reference station.

In any event, the burst time plan is processed by the monitor and control equipment 53 to be sequentially sent to the communication terminal equipment 50. The communication terminal equipment 50 comprises a frame counter 60 for defining a reference timing in the transmission part by producing a wide variety of timing signals with reference to a period of the TDMA frame shown in FIG. 4. The period may be called a TDMA frame period. The timing signals are delivered from the frame counter 60 to a memory circuit 61. The memory circuit 61 is sequentially loaded with the burst time plan in a pertinent form in synchronism with one of the timing signals. The burst time plan is successively read out of the memory circuit 61 as first and second time plan signals TP1 and TP2 in timed relation to the timing signals.

The first time plan signal TP1 is sent as an internal control signal to a burst assemble circuit 63 coupled to the terrestrial interface equipment 46. The burst assemble circuit 63 is given the transmission traffic through the terrestrial interface equipment 46 and forms a succession of data bursts of the transmission traffic with reference to the first time plan signal TP1. On the other hand, the second time plan signal TP2 is delivered to a frequency hopping control circuit 64 connected to an oscillator 65 which comprises a plurality of frequency synthesizers the number of which is equal to a total number of the transmission carrier waves at maximum. The total number of the transmission carrier waves may be represented by N. The frequency synthesizers generate internal frequency signals or internal carrier waves corresponding to the respective transmission carrier waves necessary for the frequency hopping.

Responsive to the second time plan signal TP2, the frequency hopping control circuit 64 produces a first control signal FC indicative of one of the internal frequency signals and a second control signal SC which will be described later. Supplied with the first control signal FC, the oscillator 65 sends one of the internal frequency signals to a modulator 66 which is supplied with the data bursts from the burst assemble circuit 63. As a result, the modulator 66 modulates one of the internal frequency signals by the data bursts into a modulated signal.

The modulated signal is subjected to attenuation control in an attenuator 67 supplied with the second control signal SC. Now, the second control signal SC is representative of an amount of attenuation that depends upon the second time plan signal TP2. Thus, the second time plan signal TP2 serves to individually define each electric power level of the data bursts on board the satellite 40 in the manner mentioned in conjunction with FIG. 4. At any rate, an attenuated signal is produced by the attenuator 67 in response to the second control signal SC and is subjected to frequency conversion and power amplification by the earth station equipment 51 to be sent to the satellite 40 as one of the transmission or up link carrier waves.

In the above-mentioned system, transmission power levels of the data bursts may be in one-to-one correspondence to the transmission carrier waves selected by the frequency hopping. In this case, the second time plan signal TP2 may be directly produced as the first and the second control signals FC and SC.

Figure 7:
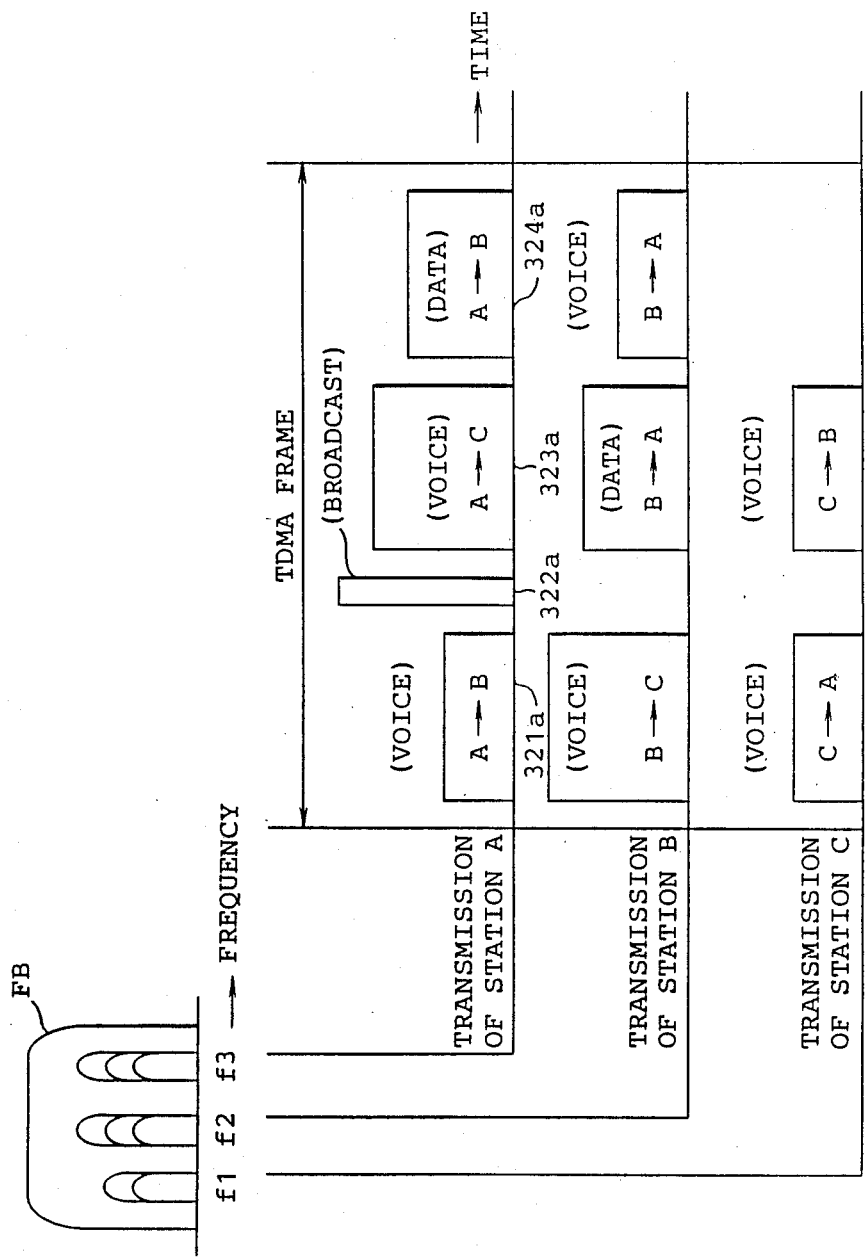
FIG. 7 is a time chart for use in describing another principle of this invention.

Referring to FIG. 7 together with FIG. 1, a time division multiple access system according to a second embodiment of this invention will diagrammatically be described on the assumption that a transponder on board a satellite is used in common for the first through third earth stations A to C and has a transponder frequency band FB and an available electric power level, like in FIG. 1. First through third carrier waves $f_1$ to $f_3$ are defined within the transponder frequency band FB and are used as up link or transmission carrier waves in the illustrated system. In the example being illustrated, the first through third carrier waves $f_1$ to $f_3$ are assigned to the third, second, and first earth stations C, B, and A, respectively.

From this fact, it is readily understood that the first through third earth stations A to C have transmitting ends which carry out transmission by the use of the third, second, and first carrier waves $f_3$, $f_2$, and $f_1$, respectively.

The first, second, and third carrier waves $f_1$, $f_2$, and $f_3$ are delivered through the satellite to each earth station as reception or down link carrier waves, respectively.

In order to receive the above-mentioned reception carrier waves, at least one of the first through third earth stations A to C must receive a plurality of the reception carrier waves simultaneously or in a time division fashion. Otherwise, it happens that communication can not be always carried out among all of the earth stations. Simultaneous reception of the plurality of the reception carrier waves can be accomplished by installing a plurality of demodulators in the earth station in question and enables demand assignment. On the other hand, frequency hopping is carried out in a receiving end of the earth station in question to receive the plurality of the reception carrier waves in the time division fashion.

Each transmission power level of the first through third carrier waves $f_1$ to $f_3$ is varied in accordance with attributes of data bursts transmitted by each carrier wave. More specifically, when the voice signal is conveyed by the data bursts, the first through third carrier waves $f_1$ to $f_3$ may be transmitted at a low transmission power level. On the other and, the transmission power level of each carrier wave $f_1$ to $f_3$ must be high on data transmission in comparison with the transmission power level necessary for the transmission of the voice signal because of requirement of a high transmission quality in the data transmission. Furthermore, it is assumed that the third earth station C has a scale and/or a receiving condition different from the first and the second earth stations A and B, like in FIG. 4. In this connection, the third earth station C has the transmission power level weaker than those of the first and the second earth stations A and B and must be supplied with reception carrier waves of high electric power levels.

Under the circumstances, the first earth station A transmits first, second, third, and fourth data bursts depicted at 321a, 322a, 323a, and 324a within a TDMA frame. The first and the third data bursts 321a and 323a convey voice signals delivered to the second and the third earth stations B and C, respectively, while the fourth data burst 324a carries a data signal delivered to the second earth station B.

As shown in FIG. 7, the fourth data burst 324a has a transmission power level higher than the first data burst 321a, in spite of the fact that both the first and the fourth data bursts 321a and 324a are delivered to the same earth station B. This results from a difference of required transmission qualities between the voice and the data signals, as mentioned before. The third data burst 323a has a high transmission power level in comparison with the fourth data burst 324a in consideration of a difference between the scales and the receiving conditions of the third and the second earth stations C and B.

The above-mentioned relationships among the data bursts transmitted from the first earth station A are true of the data bursts transmitted from the second and the third earth stations B and C. Accordingly, description will be omitted about the data bursts transmitted from the second and the third earth stations B and C.

Herein, it is to be noted that the first earth station A transmits the second data burst 322a in a broadcast mode so as to distribute the second data burst 322a to all of the earth stations B and C except the first earth station A. The second data burst 322a may therefore be named a broadcast burst. During the broadcast mode of the first earth station A, neither the second earth station B nor the third earth station C can carry out any transmission in the illustrated system. In other words, the third carrier wave $f_3$ alone is transmitted to the satellite in the broadcast mode. This shows that three carrier waves are reduced to a single carrier wave in the broadcast mode.

Such a reduction of the carrier waves is very helpful to increase the transmission power level of the broadcast bust and to therefore distribute the broadcast burst to the earth stations with a high transmission quality. Accordingly, the broadcast burst can be received even at a certain one of the earth stations that is operated under a very bad receiving condition.

It is possible to control the bursts and the transmission power levels of the bursts by the use of a burst time plan.

The available electric power level of the transponder is defined in consideration of a maximum number of carrier waves which can be transmitted by earth stations of large scales under a clear sky condition with a usual transmission quality kept in the earth stations. The maximum number of the carrier waves may be called a first predetermined number which can be generalized by N. The available electric power level is equal to an electric power level available for the carrier waves, N in number, and may be referred to as a first total electric power level. As regards the illustrated system, the first predetermined number may be regarded as being greater than three.

On the other hand, the carrier waves which are transmitted from the earth stations are varied in number with time in the illustrated system, as shown in FIG. 7. Such a variable number of the carrier waves may be called a second predetermined number which may be represented by M and which is not greater than N. The carrier waves of the second predetermined number M are transmitted from the earth stations with the transmission power levels individually variable and are received by the satellite with reception electric power levels, respectively. A sum of the reception electric power levels may be defined as a second total electric power level for the carrier waves, M in number.

Under the circumstances, the burst time plan is designed or formed so that the second total electric power level does not exceed the first total power level. Practically, each of the transmission power levels is controlled by the burst time plan in order that the second total electric power level falls within the first total power level on the satellite.

Figure 8:
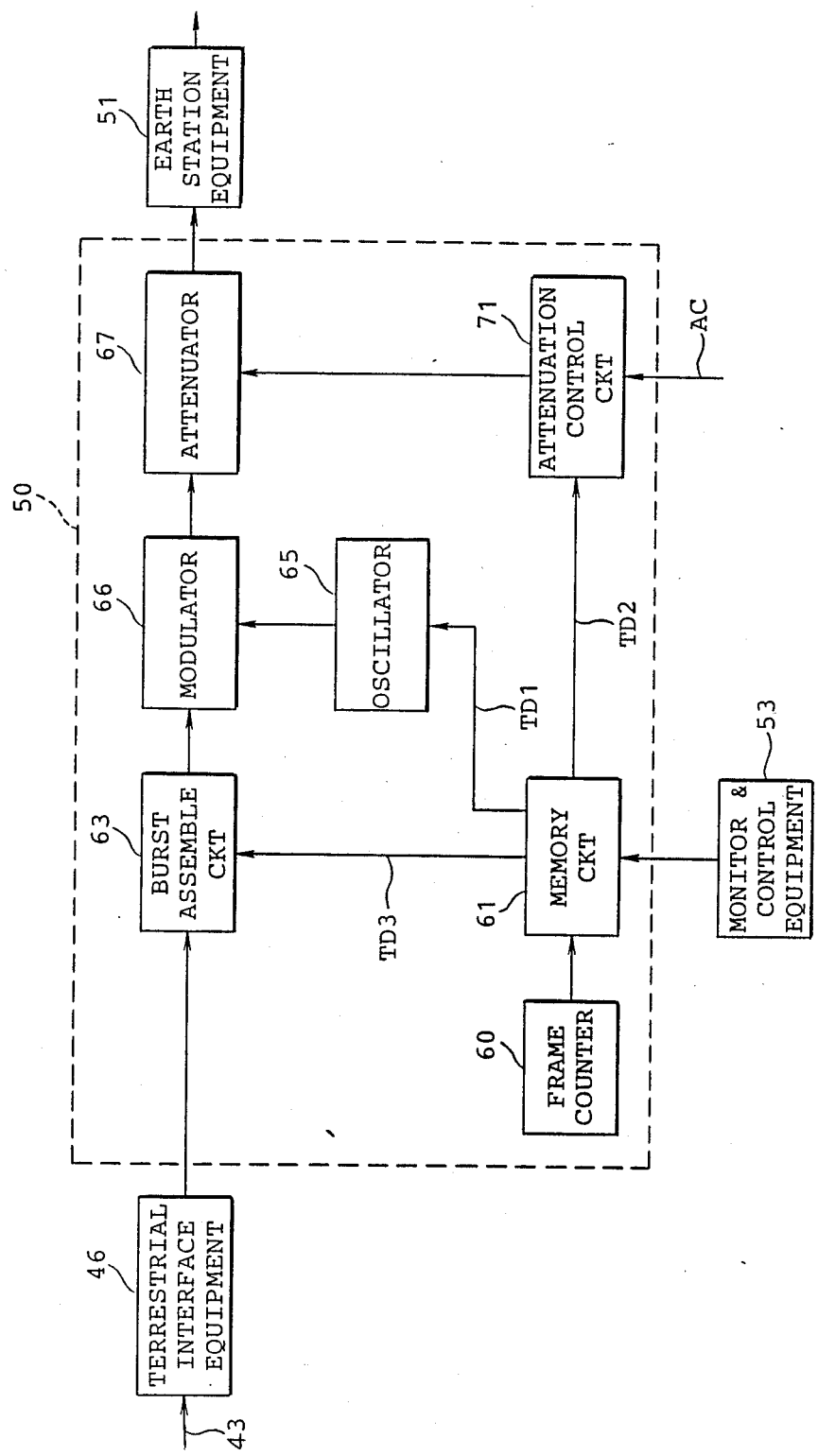
FIG. 8 is a block diagram of an earth station operable in accordance with the principle illustrated with reference to FIG. 7.

Referring to FIG. 8 in addition to FIG. 5, the time division multiple access system according to the second embodiment of this invention is specified by a communication terminal equipment 50 shown in FIG. 8. The communication terminal equipment 50 (FIG. 8) is similar to that illustrated in FIG. 6 except that any frequency hopping may not be carried out in a transmitting end of the communication terminal equipment 50 of FIG. 8. This shows that such frequency hopping is carried out in a receiving end (not shown).

An attenuation control circuit 71 is controlled by the burst time plan stored through the monitor and control equipment 53 in the memory circuit 61 in the manner described in conjunction with FIG. 6. The memory circuit 61 is coupled to the burst assemble circuit 63 like in FIG. 6 and is also coupled direct to the oscillator 65 comprising a plurality of frequency synthesizers for generating a plurality of the frequency signals. In the illustrated example, the oscillator 65 may generate only one frequency signal.

The time burst plan is read out of the memory circuit 61 in synchronism with the timing signals sent from the frame counter 60 in the form of first, second, and third time plan data signals TD1, TD2, and TD3. The first through third time plan data signals TD1, TD2, and TD3 are delivered to the oscillator 65, the attenuation control circuit 71, and the burst assemble circuit 63, respectively. The first time plan data signal TD1 defines the frequency signal determined for each earth station.

Under the circumstances, the burst assemble circuit 63 supplies the modulator 66 with a succession of data bursts conveying traffic in the above-mentioned manner.

The first time plan data signal TD1 is representative of a selected one of the frequency signals and is supplied as an internal control signal to the oscillator 65. As a result, the selected one of the frequency signals is sent as an internal carrier wave to the modulator 66. The internal carrier wave is modulated in the modulator 66 by the internal carrier wave to be produced as a modulated signal.

The second time plan data signal TD2 is indicative of an amount of attenuation so as to produce the data bursts which are variable in the transmission power levels, as shown in FIG. 7. The second time plan data signal TD2 is supplied to the attenuation control circuit 71.

The attenuation control circuit 71 may be supplied with an additional control signal representative of a state of each earth station or the like. At any rate, the attenuation control circuit 71 delivers an attenuation control signal to the attenuator 67 with reference to the second time plan data signal TD2 and the additional control signal AC.

The attenuator 67 attenuates the modulated signal in response to the attenuation control signal into an attenuated signal which is sent through the earth station equipment 51 to the satellite in the manner mentioned in conjunction with FIG. 6. The attenuation control signal may be indicative of no attenuation. In this case, the modulated signal is delivered as the attenuated signal to the earth station equipment 51 without attenuation.

Figure 9:
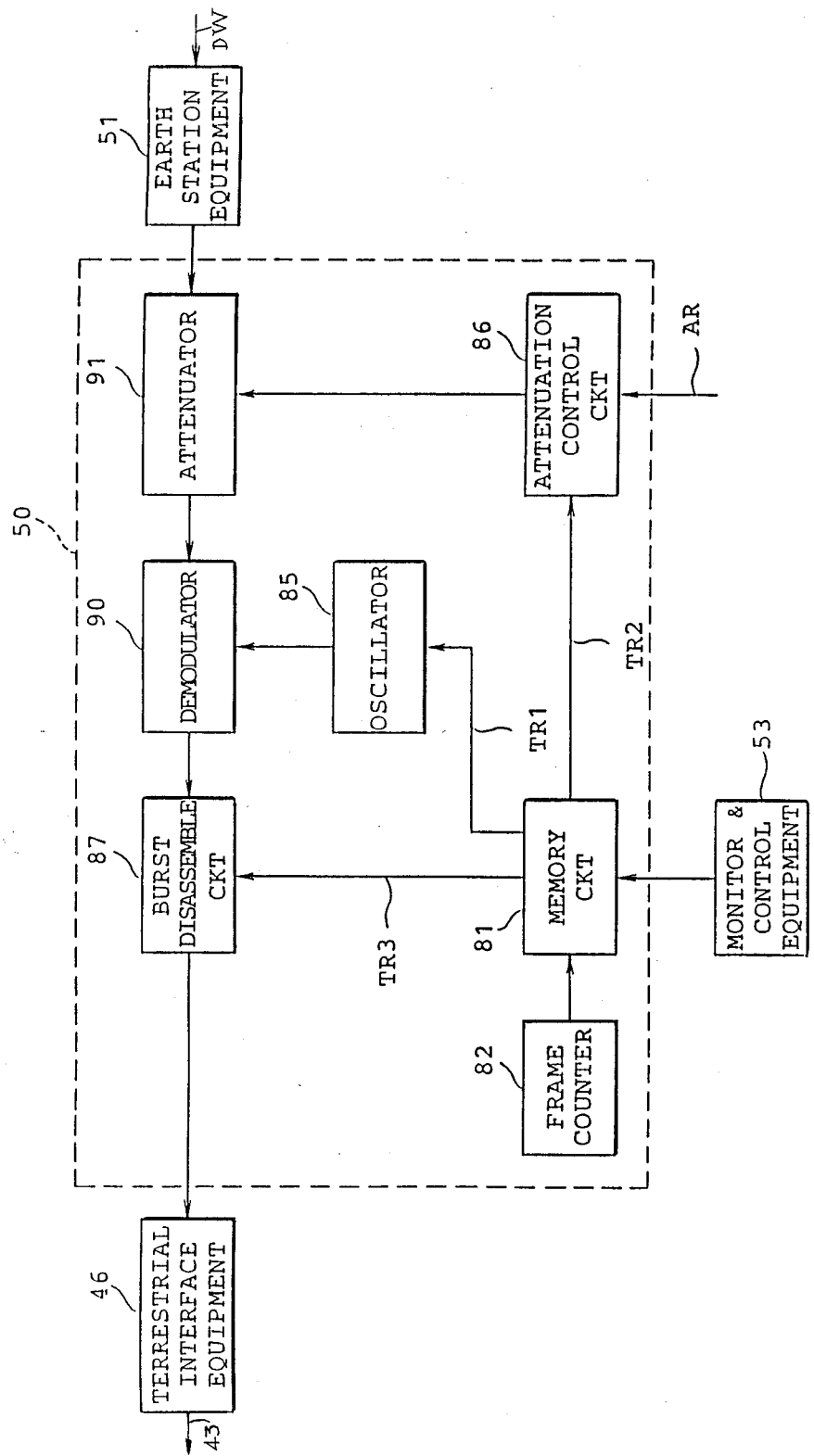
FIG. 9 is a block diagram of another earth station operable in accordance with the principle described with reference to FIG. 7.

Referring to FIG. 9 afresh and FIG. 5 again, a time division multiple access system according to a third embodiment of this invention is specified by that receiving part or section of the communication terminal equipment 50 which is operable in response to each of reception or down link carrier waves depicted at DW in FIG. 9. As shown in FIG. 5, each of the down link carrier waves can be sent from the earth station equipment 51 through the communication terminal equipment 50 and the terrestrial interface equipment 46 to the terrestrial link 43.

Although no description has thus far been made about a receiving end of each earth station, it is preferable that electric power control as mentioned above is carried out not only in a transmitting end of each earth station but also in a receiving end thereof, so as to effectively demodulate each data burst controlled in the transmission power level in the above-mentioned manner. To this end, the system illustrated in FIG. 9 is directed to the receiving section of the communication terminal equipment 50 which is operable as a part of the receiving end of each earth station.

It is assumed that the down link carrier waves DW carry data bursts in a manner described with reference to FIG. 7 and that the frequency hopping is carried out in the receiving section of the communication terminal equipment 50 in a manner to be described later.

A burst time plan as described in conjunction with FIG. 7 is sent from the reference station to the earth station in question through the satellite 40 in the above-mentioned manner and is stored in a memory circuit 81 through the monitor and control equipment 53. The illustrated memory circuit 81 is assumed to be different from the memory circuit 61 illustrated in FIG. 8, although a single memory circuit may be used as both the memory circuits 61 and 81. The memory circuit 81 is controlled by a frame counter 82, which is operable in a manner similar to the frame counter 60 (FIG. 8).

The memory circuit 81 of FIG. 9 distributes first, second, and third reception time plan signals TR1, TR2, and TR3 to an oscillator 85, an attenuation control circuit 86, and a burst disassemble circuit 87, respectively.

The first reception time plan signal TR1 indicates each of the down link carrier waves switched from one to another in a time division fashion, so as to selectively receive the data bursts destined to the earth station in question. Selection of the down link carrier waves in the earth station can be readily understood by referring to FIG. 7 and will not therefore be described any longer. The oscillator 85 comprises a plurality of synthesizers for generating a plurality of reception frequency signals which correspond to the reception carrier waves. Supplied with the first reception time plan signal TR1, the oscillator 85 supplies a demodulator 90 with a selected one of the reception frequency signals that is indicated by the first reception time plan signal TR1. Anyway, the reception frequency signals are switched from one to another in accordance with the first reception time plan signal TR1. Thus, the frequency hopping is carried out by the oscillator 85 and the memory circuit 81.

The second reception time plan signal TR2 indicates amounts of attenuations which are subjected to the data bursts conveyed by the down link carrier waves DW, respectively.

Responsive to the second reception time plan signal TR2, the attenuation control circuit 86 is operable to make power levels of the data bursts substantially equal to one another. To this end, the attenuation control circuit 86 produces an attenuation control signal representative of the amounts of attenuation which is inverse relative to those given by the attenuator 67 (FIG. 8). An additional reception control signal AR may be selectively given to the attenuation control circuit 86 in a manner similar to the additional control signal AC (FIG. 8). In this case, the attenuation control signal depends on both the second reception time plan signal TR2 and the additional reception control signal AR.

Supplied with the attenuation control signal, an attenuator 91 attenuates the data bursts received through the earth station equipment 51 and supplies an attenuated signal to the demodulator 90. The attenuated signal carries the data bursts which have power levels equalized by the attenuator 91.

The demodulator 90 demodulates the attenuated signal into a demodulated signal in response to the selected reception frequency signal given from the oscillator 85. The demodulated signal is sent to the burst disassemble circuit 87 which is given the third reception time plan signal TR3. Inasmuch as the third reception time plan signal TR3 indicates reception ones of the data bursts that are to be received by the earth station, the burst disassemble circuit 87 extracts, from the demodulated signal, the reception data bursts which are necessary for the earth station in question and which are delivered to the terrestrial link 43 through the terrestrial interface equipment 46.

With this structure, it is possible to keep the power levels of the data bursts substantially constant without any nonlinear circuit, such as a limiter or the like.

Figure 10:
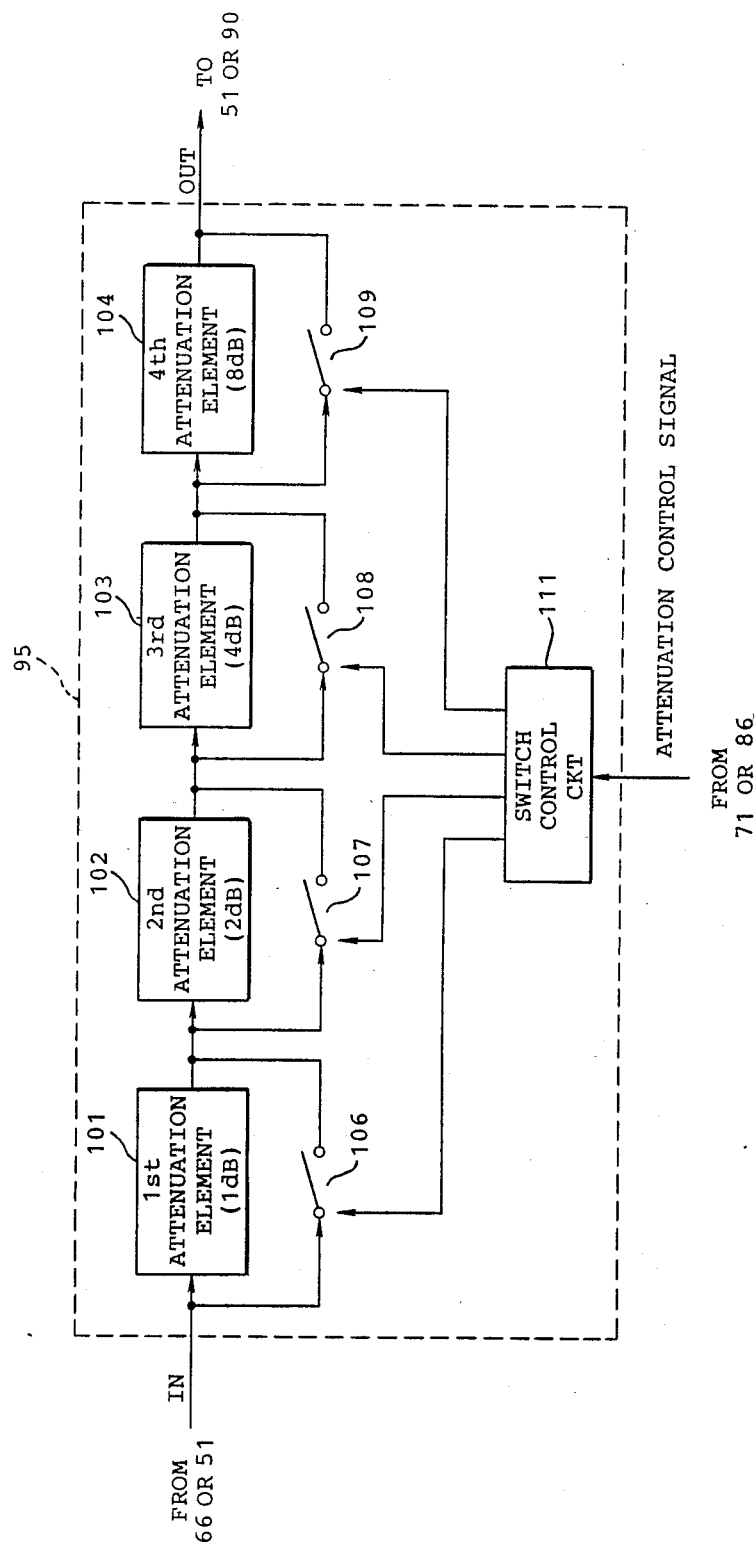
FIG. 10 is a block diagram of an attenuation circuit which is applicable to the earth stations illustrated in FIGS. 8 and 9.

Referring to FIG. 10, exemplification is made of an attenuation circuit 95 which can be used as the attenuators 67 and 91 illustrated in FIGS. 8 and 9. When the illustrated attenuation circuit 95 is used as the attenuator 67 of FIG. 8, the modulated signal is given as an input signal IN from the modulator 66 to the attenuation circuit 95 and the attenuated signal is sent as an output signal OUT to the earth station equipment 51. On the other hand, the input signal IN is given from the earth station equipment 51 to the attenuation circuit 95 and the output signal OUT is sent to the demodulator 90 when the attenuation circuit 95 is used as the attenuator 91 of FIG. 9. Likewise, the attenuation control signal is given from the attenuation control circuit 71 or 86 illustrated in FIG. 8 or 9.

Now, the illustrated attenuation circuit 95 comprises first, second, third, and fourth fixed attenuation elements 101, 102, 103, and 104 connected in series to one another and first, second, third, and fourth switches 106, 107, 108, and 109 for shunting the first, the second, the third, and the fourth switches 101, 102, 103, and 104, respectively. The first through fourth attenuation elements 101 to 104 have amounts of attenuation equal to 1 dB, 2 dB, 4 dB, and 8 dB, respectively. From this fact, it is readily understood to optionally change the amounts of attenuation from 0 dB to 15 dB at every step of 1 dB by selecting combinations of the first through fourth attenuation elements 101 to 104 by the first through fourth switches 106 to 109.

In order to control each of the first through fourth switches 106 to 109 and to thereby select the combinations of the first through fourth attenuation elements 101 to 104, the attenuation circuit 95 comprises a switch control circuit 111 operable in response to the attenuation control signal sent from the attenuation control circuit 71 or 86. The switch control circuit 111 serves to selectively open or close the first through fourth switches 106 to 109. Consequently, the first through fourth attenuation elements 101 to 104 are selectively bypassed or shunted by the first through fourth switches 106 to 109.

If the attenuation control signal is a binary signal representative of the amounts of attenuation on the dB scale, the switch control circuit 111 may be a decoder for decoding the binary signal into a selection signal for selecting the first through fourth switches 106 to 109.

Figure 11:
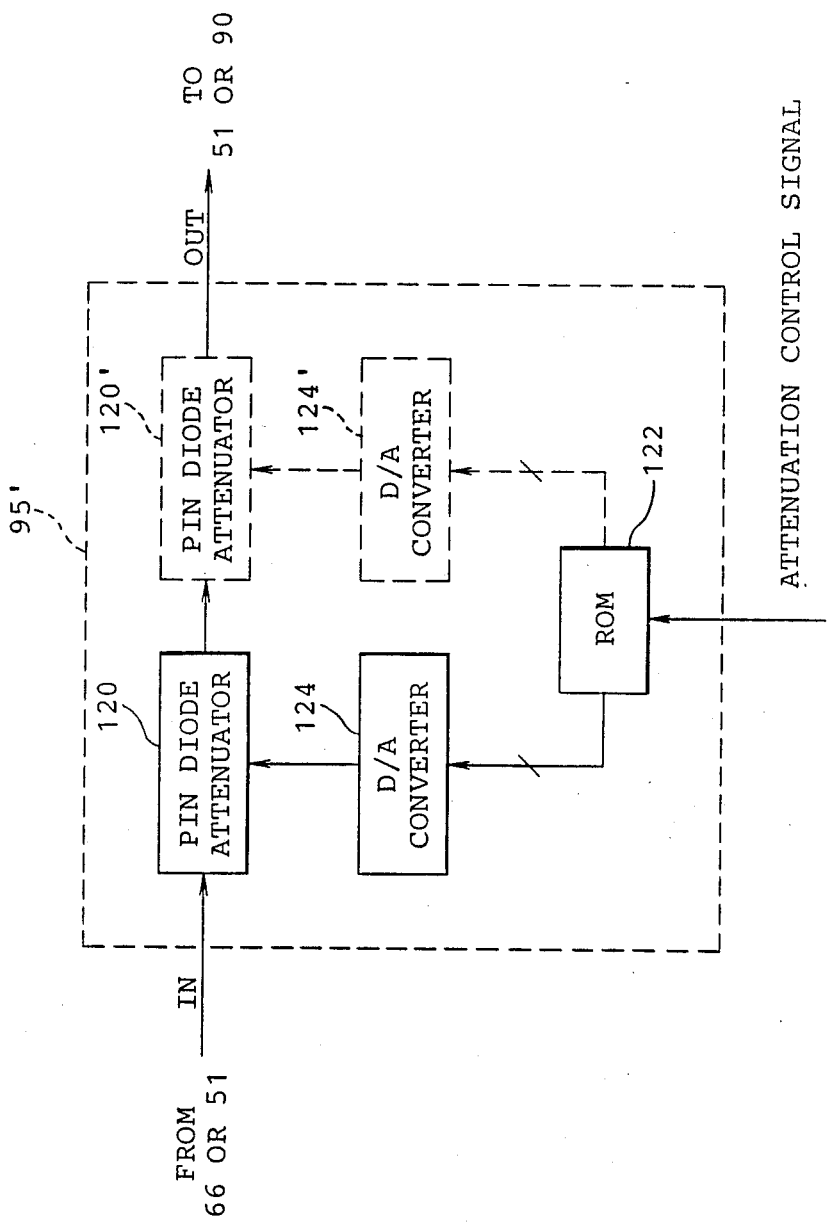
FIG. 11 is a block diagram of another attenuation circuit applicable to the earth stations illustrated in FIGS. 8 and 9.

Referring to FIG. 11, an attenuation circuit 95' is exemplified which is applicable to the attenuator 67 or 91 illustrated in FIG. 8 or 9. The attenuation circuit 95' is supplied with an input signal IN to produce an output signal OUT in accordance with an attenuation control signal, like in FIG. 10. The illustrated attenuation circuit 95' comprises a PIN diode attenuator 120 which comprises a PIN diode (not shown). As known in the art, the PIN diode attenuator 120 can control an amount of attenuation by adjusting a bias voltage of the PIN diode. Generally, a single PIN diode enables attenuation of about 20 dB. If more than 20 dB of the attenuation is required, an additional PIN diode attenuator 120' may be connected to the PIN diode attenuator 120 in series, as shown by a broken line.

In order to obtain a desired amount of attenuation, each bias voltage of the PIN diode or diodes should be controlled in each of the PIN diode attenuator 120 or attenuators 120 and 120'. For this purpose, the attenuation circuit 95' comprises a read-only memory (ROM) circuit 122 accessed by the attenuation control signal. The attenuation control signal is given as an address signal to the read-only memory (ROM) circuit 122 and is converted into a digital signal representative of the amounts of attenuation and sent to a digital-to-analog converter 124. When the additional PIN diode attenuator 120' is included in the attenuation circuit 95', an additional digital-to-analog converter 124' is connected between the read-only memory 122 and the additional PIN diode attenuator 120' as depicted at a broken block, and is supplied with an additional digital signal. The digital signal and the additional digital signal are converted into an analog signal and an additional analog signal by the digital-to-analog converter 124 and the additional digital-to-analog converter 124', respectively.

Thus, the input signal IN is attenuated by the PIN diode and the additional PIN diode attenuators 120 and 120' in response to the analog and the additional analog signals, respectively, and is produced as the output signal OUT.

Figure 12:
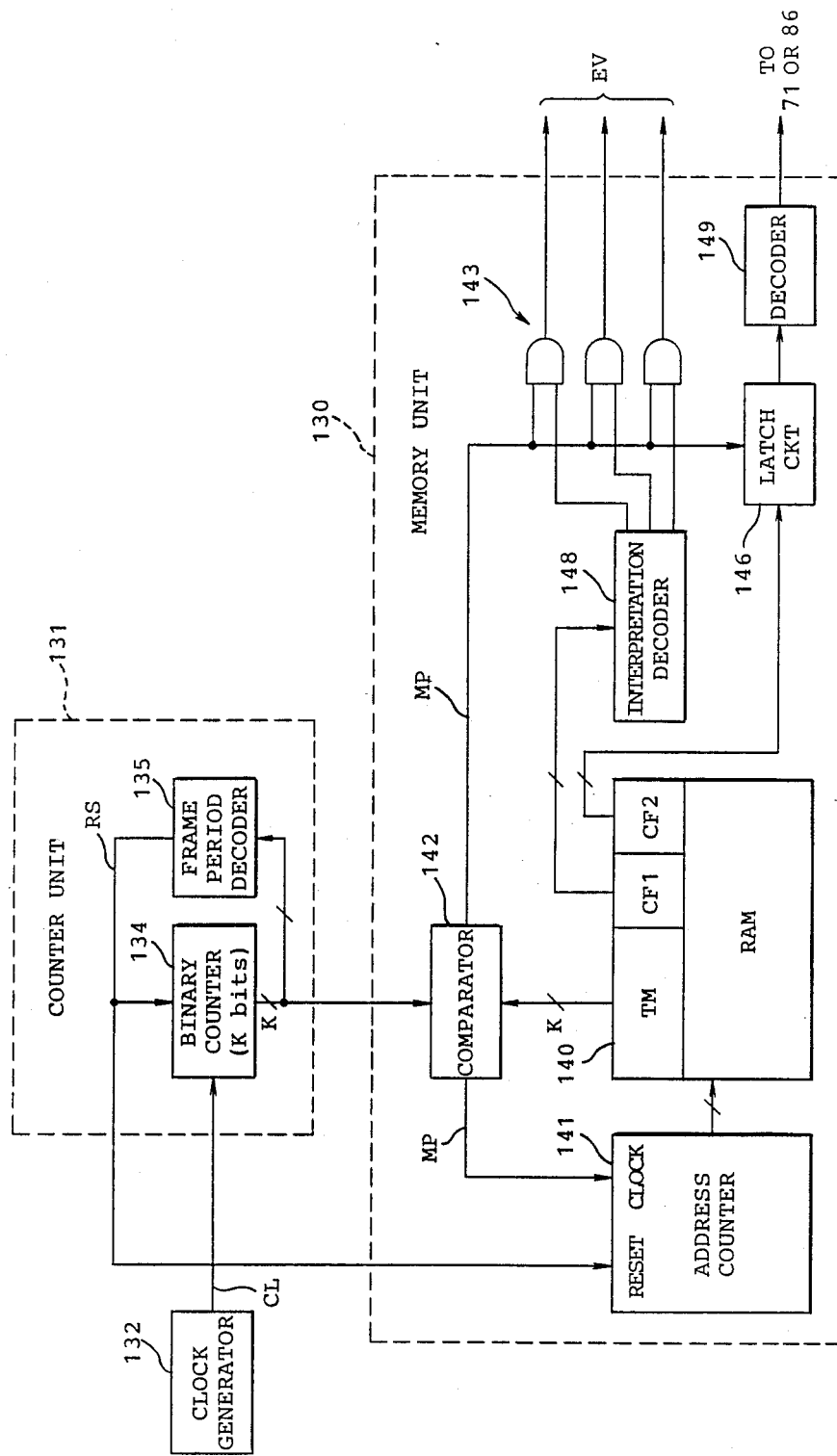
FIG. 12 is a block diagram of a circuit arrangement which is for use in the earth stations illustrated in FIGS. 8 and 9.

Referring to FIG. 12, description will be made about a circuit arrangement which comprises a combination of a memory unit 130 and a counter unit 131 connected to a clock generator 132. The illustrated circuit arrangement is operable to distribute event pulses EV to various parts of an earth station in accordance with a burst time plan. Herein, it is to be noted that the illustrated memory unit 130 may be used as the memory circuit 61 (FIG. 8) or 81 (FIG. 9) while the illustrated counter unit 131 may be used as the frame counter 60 (FIG. 8) or 82 (FIG. 9). In this connection, it may be said that the event pulses EV specify start timing of events which have to be done in the earth station and may be used to produce the first and the third time plan data signals TD1 and TD3 (FIG. 8) or the first and the third reception time plan signals TR1 and TR3 (FIG. 9).

In FIG. 12, the clock generator 132 generates a sequence of symbol clocks CL at a predetermined rate which is equal to a symbol rate of symbols to be transmitted. The counter unit 131 comprises a binary counter 134 of K bits driven by the symbol clocks CL and a frame period decoder 135 operable in cooperation with the binary counter 134. Specifically, a counter output signal of K bits is delivered from the binary counter 134 to the memory unit 130 and the frame period decoder 135. When the counter output signal is counted to a preselected value, the frame period decoder 135 sends a reset pulse RS to the binary counter 134 to put the same into a reset state. Thus, the binary counter 134 is reset at a frame period which may be the TDMA frame period.

The illustrated memory unit 130 comprises a random access memory (RAM) 140 loaded with the burst time plan in an available form. In the example being illustrated, the burst time plan is translated into a sequence of code words each of which is made to a single one of the events and which is composed of timing information TM of K bits, first control information CF1, and second control information CF2. The code words are memorized in memory addresses of the random access memory 140 in the order of occurrence, respectively. In the illustrated example, the memory addresses are assumed to be specified in an ascending order from an initial address in relation to the order of occurrence of the events.

In each code word, the timing information specifies counts of the binary counter 134 at which the events take place while the first control information CF1 specifies the meanings of the respective events and circuits used in the respective events. In addition, the second control information CF2 defines an operating state which is to be carried out during a time interval between two adjacent ones of the events. The timing information TM, the first control information CF1 and the second control information CF2 are stored in a timing information field, a first control information field, and a second control information field, respectively.

The illustrated random access memory 140 cooperates with an address counter 141 and a comparator 142 in the following manner. The address counter 141 is supplied with the reset pulse RS from the frame period decoder 135 and is therefore put into an initial state to indicate the initial address of the random access memory 140. As a result, a first one of the code words is read out of the initial address. The timing information TM of the first code word is supplied to the comparator 142. Inasmuch as the comparator 142 is also supplied with the counter output signal of K bits in parallel, the comparator 142 compares the timing information TM with the counter output signal successively varied at the symbol rate. When the timing information TM is coincident or matched with the counter output signal, the comparator 142 delivers a match pulse MP to the address counter 141. The match pulse MP is also delivered to a group of AND gates collectively depicted at 143 and a latch circuit 146.

On the other hand, the first control information CF1 of the first code word is sent to an interpretation decoder 148 for interpreting a content of the first control information CF1 under consideration to supply one of the AND gates 143 with a logic "1" level. The second control information CF2 is sent to the latch circuit 146. Responsive to the match pulse MP, one of the AND gates 143 is opened to produce the logic "1" level as one of the event pulses EV and the latch circuit 146 latches or stores the second control information CF2 of the first code word to define the operating state kept until the next following one of the code words.

The second control information CF2 which is kept in the latch circuit 146 is sent directly or through a decoder 149 to the attenuation control circuit 71 (FIG. 8) or 86 (FIG. 9) as the second time plan data signal TD2 (FIG. 8) or the second reception time plan signal TR2.

Supplied with the match pulse MP, the address counter 141 is counted up by one to indicate the next following one of the addresses. Consequently, a second one of the code words is read out of the next following memory address and is processed in the above-mentioned manner.

Figure 13:
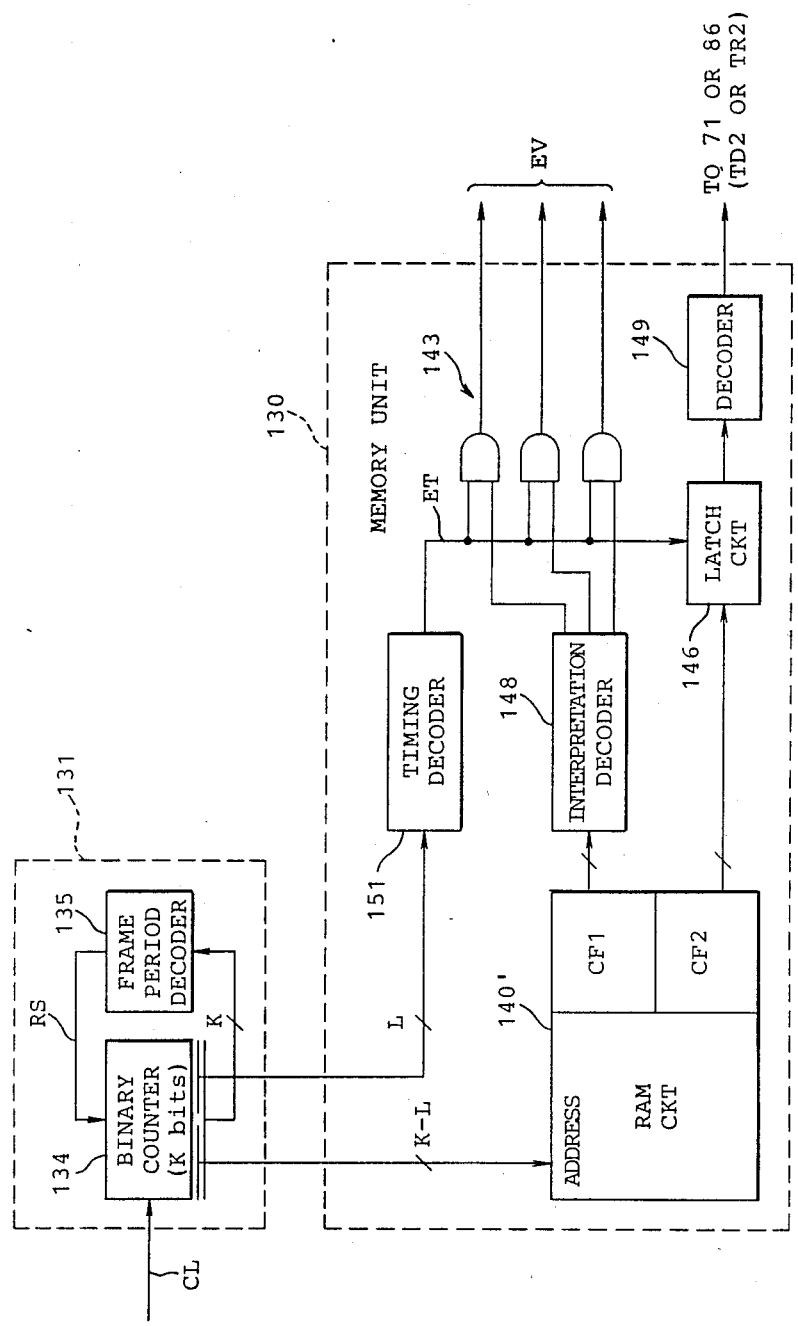
FIG. 13 is a block diagram of another circuit arrangement which is for use in the earth stations illustrated in FIGS. 8 and 9.

Referring to FIG. 13, another circuit arrangement comprises a memory unit 130 and a counter unit 131 which are operable in a manner similar to those illustrated in FIG. 12, although the memory unit 130 and the counter unit 131 are somewhat different in structure from those illustrated in FIG. 12.

In FIG. 13, the counter unit 131 comprises a binary counter 134 of K bit operable in response to a sequence of symbol clocks CL and a frame period decoder 135 for producing a reset pulse RS, like the counter unit 131 shown in FIG. 12. Herein, it is to be noted that a counter output signal of K bits is divided into a less significant part of L bits and a more significant part of (K−L) bits. In the example being illustrated, it is assumed that the events are changed from one to another when the symbol clocks CL are counted to $2^L$ or an integral multiple of $2^L$.

Taking this into consideration, the memory unit 130 delivers event pulses EV to various parts of an earth station in question at each time when counts of the symbol clocks CL become equal to $2^L$. In order to produce such event pulses EV, the memory unit 130 comprises a timing decoder 151 supplied with the less significant part of L bits of the counter output signal. The timing decoder 151 monitors a preselected pattern of, for example, all zeros to deliver an event timing pulse ET to a group of AND gates 143 and a latch circuit 146, both of which are identical to those illustrated in FIG. 12. The AND gates 143 are connected to an interpretation decoder 148 similar to that shown in FIG. 12.

The memory unit 130 illustrated in FIG. 13 comprises a random access memory (RAM) circuit 140' supplied with the more significant part of (K−L) bits of the counter output signal. The RAM circuit 140' has a plurality of memory addresses loaded with a plurality of code words each of which is composed of the first control information CF1 and the second control information CF2. Each code word comprises no timing information.

With this structure, the more significant part of the counter output signal is supplied to the RAM circuit 140' as an address signal specifying each of the memory addresses, each time when the symbol clocks CL are counted to $2^L$. As a result, the first control information CF1 and the second control information CF2 are read out of the RAM circuit 140' at every period of $2^L$ and processed in the manner illustrated with reference to FIG. 12.

Therefore, the address counter 141 shown in FIG. 12 can be omitted from the memory unit 130 of FIG. 13.

Figure 14:
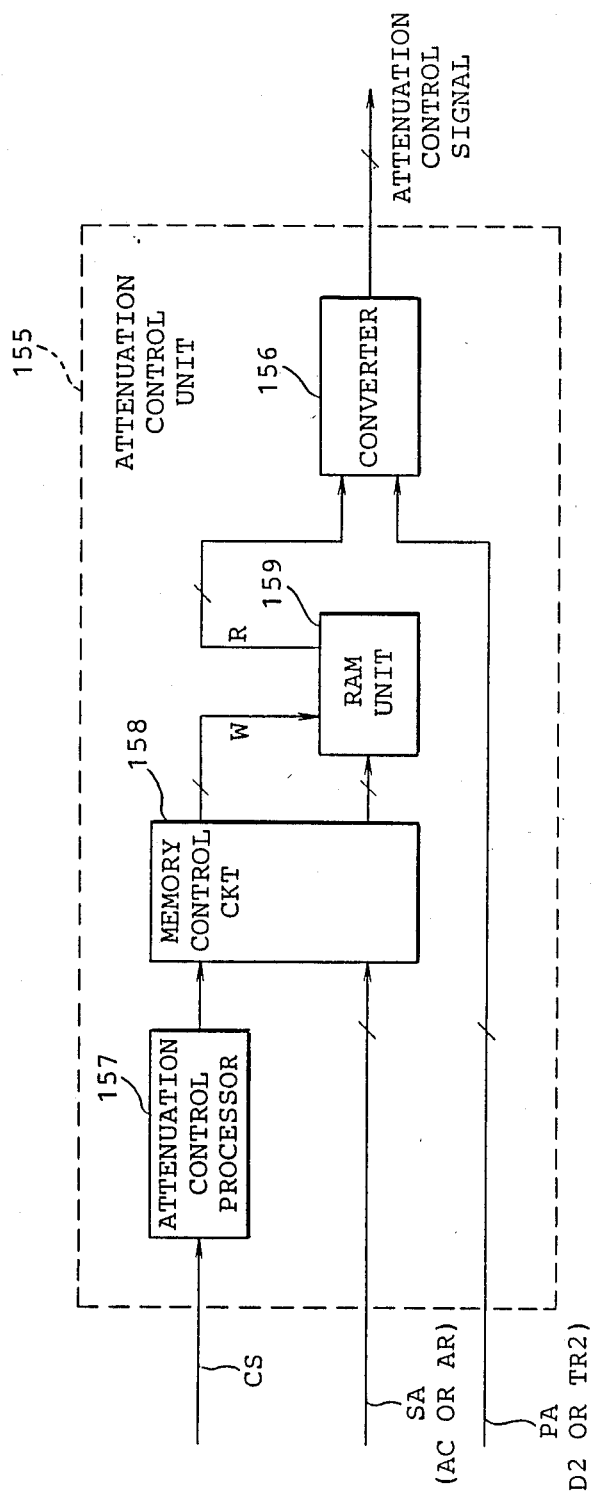
FIG. 14 is a block diagram of an attenuation control circuit illustrated in FIGS. 8 and 9.

Finally referring to FIG. 14, an attenuation control unit 155 is applicable to the attenuation control circuit 71 (FIG. 8) or 86 (FIG. 9). In this event, the second control information CF2 (shown in FIG. 12 or 13) is given from the latch circuit 146 to the attenuation control circuit 155 as the second time plan data signal TD2 or the second reception time plan signal TR2. Such a time plan signal TD2 or TR2 may be called a primary attenuation signal depicted at PA in FIG. 14. The primary attenuation signal PA is sent to a converter 156 to be converted into the attenuation control signal which is delivered to the attenuator 67 or 91.

Now, it is presumed that the amounts of attenuation in the attenuator 67 or 91 can be uniquely determined only by the burst time plan and that the second control information CF (namely, the primary attenuation signal PA) carries codes indicative of the amounts of attenuation. In this situation, the codes may be directly converted into the attenuation control signal by the converter 156. Such a primary attenuation signal PA may usually be of two or three bits and can specify the amounts of attenuation on a comparatively large scale of, for example, 2 or 3 dB.

The illustrated attenuation control unit 155 can determine the amounts of attenuation in consideration of other various actual conditions in addition to the primary attenuation control signal PA. For this purpose, the attenuation control unit 155 is supplied with a channel status signal CS representative of status of a specific one or ones of channels. Such a channel status signal CS is given from the reference station in a known manner when an actual communication state is changed at or near a certain earth station due to a heavy rain or the like. In this case, the channel status signal SC serves to control, namely, increase transmission electric power related to the certain earth station.

A subsidiary attenuation signal SA, such as the additional control signal AC (FIG. 8) or the additional reception control signal AR (FIG. 9), is supplied to the attenuation control unit 155. The subsidiary attenuation signal SA indicates an additional attenuation condition, as mentioned before in conjunction with AC or AR.

The channel status signal CS is supplied to an attenuation control processor 157 which may be implemented by a microprocessor. The attenuation control processor 157 is operable to interpret the channel status signal CS and to decide an actual amount of attenuation depending upon a variation of the actual communication state. The actual amount of attenuation is sent as an actual amount signal to a memory control circuit 158 together with the subsidiary attenuation signal SA. Each of the subsidiary attenuation signal SA and the actual amount signal is accompanied by an object code which is representative of an object, such as bursts, earth stations, carriers, to be controlled.

The memory control circuit 158 is operable to control a random access memory (RAM) unit 159 which has many addresses. The addresses of the RAM unit 159 are made to correspond to station identification codes of destined earth stations, burst identification codes or burst numbers assigned to transmission bursts, and carrier selection signals indicative of carrier waves for the frequency hopping, respectively. In other words, the station identification codes, the burst identification codes, and the carrier selection signals may be given to the RAM unit 159 as address signals for specifying the respective addresses and can be carried by the second control information CF2.

Supplied with each object code accompanied by the actual amount signal and the subsidiary attenuation signal, the memory control circuit 158 translates each object code into the corresponding address signal and stores each of the subsidiary attenuation signal and the actual amount signal into each address specified by the address signal.

After storage of the subsidiary attenuation and the actual amount signals, the RAM unit 159 continuously carries out only a readout operation until a variation of any conditions is indicated by each of the subsidiary attenuation signal SA and the actual amount signal. At any rate, a readout signal is read out of the RAM unit 159 to be supplied to the converter 156 and is summed up together with the primary attenuation signal PA by the converter 156 to be produced as the attenuation control signal.

Thus, the illustrated attenuation control unit 155 can flexibly cope with variation of various conditions and serves to control transmission or reception power levels of carrier waves.

While this invention has thus far been described in conjunction with a few embodiments thereof, it will readily be possible for those skilled in the art to put this invention into practice in various other manners without departing from the spirit and scope of the invention as set forth in the appended claims. For example, this invention may be used in an international satellite communication system. In FIG. 4, the reception carrier waves corresponding to the first through the third carrier waves $f_1$ to $f_3$ may be assigned to different ones of the earth stations, respectively, although the second and the third carrier waves $f_2$ and $f_3$ are used for data transmission and voice transmission, respectively. The attenuators illustrated in FIGS. 10 and 11 can be used as the attenuator 67 illustrated in FIG. 6. Likewise, the burst time plan in FIG. 6 may be delivered to the burst assemble circuit 63 and the frequency hopping control circuit 64 in a manner similar to that illustrated in FIG. 12 or 13. At any rate, the burst time plan may be either variable or invariable with time.

What is claimed is:

1. In a time division multiple access system comprising a plurality of earth stations communicable with one another in accordance with a burst time plan through a satellite which comprises a single transponder operable in response to a first predetermined number of carrier waves, N in number, where N is a natural number greater than unity, said transponder having a first total electric power level available for said first predetermined number of the carrier waves, the improvement wherein:
   a second predetermined number of said carrier waves, M in number, are selected as selected carrier waves from said carrier waves of the first predetermined number in accordance with said burst time plan so that said selected carrier waves have a second total electric power level which does not exceed said first total electric power level in transponder, each of said first and said second predetermined numbers being representative of the number of up link carrier waves directed from the earth stations towards said satellite;
   at least one of said earth stations having a transmitting end which is accessible to a plurality of said link carrier waves by frequency hopping.

2. A time division multiple access system as claimed in claim 1, wherein at least a part of said individual electric power levels is determined by said burst time plan which is delivered to the earth stations related to said part of the individual electric power levels.

3. A time division multiple access system as claimed in claim 1, wherein at least a part of said individual electric power levels is determined by information sent from the earth stations related to said part of the individual electric power levels.

4. A time division multiple access system as claimed in claim 1, said up link carrier waves conveying a plurality of transmission signals having different contents from one of said transmission signals to another of said transmission signals, wherein at least a part of said individual electric power levels is determined in accordance with said contents.

5. A time division multiple access system as claimed in claim 1, each of said earth stations comprising generating means responsive to a first control signal for generating an internal frequency signal determined by said first control signal, modulating means responsive to said internal frequency signal and information to be conveyed for modulating said internal frequency signal by said information to produce a modulated signal, sending means coupled to said modulated signal for sending said modulated signal towards said satellite as one of said up link carrier waves that is divisible into a succession of time division multiple access frames, memory means for memorizing said burst time plan to produce a time plan signal in accordance with said burst time plan, and signal supply means for supplying said time plan signal to said generating means as said first control signal, wherein:
   said time plan signal is made to correspond to amounts of attenuation determined in relation to said up link carrier waves, respectively;
   said signal supply means comprising:
   means responsive to said time plan signal for producing, in addition to said first control signal, a second control signal representative of each of said amounts of attenuation;
   said sending means in each of said earth stations comprising:
   attenuating means responsive to said second control signal for attenuating said modulated signal in accordance with said second control signal into an attentuated signal and;
   means for producing said attenuated signal as one of said up link carrier signals.

6. A time division multiple access system as claimed in claim 1, said earth stations having reception conditions which are different from one another and which are fixed for said earth stations, respectively, wherein said up link carrier waves have individual and fixed electric power levels which are determined in consideration of said reception conditions so that the second total electric power level does not exceed said first total electric power level on said satellite.

7. A time division multiple access system as claimed in claim 1, said earth stations having reception conditions which are different from one another and which are variable with time, wherein said up link carrier waves have individual electric power levels which are determined in consideration of said reception conditions measured at and informed from an associated one of said earth stations so that the second total electric power level does not exceed said first total electric level on said satellite.

8. In a time division multiple access system comprising a plurality of earth stations communicable with one another in accordance with a burst time plan through a satellite which comprises a transponder operable in response to a first predetermined number of carrier waves, N in number, where N is a natural number greater than unity, said transponder having a first total electric power level available for said first predetermined number of the carrier waves, the improvement wherein;

a second predetermined number of said carrier waves, M in number, are selected as selected carrier waves from said carrier waves of the first predetermined number in accordance with said burst time plan so that said selected carrier waves have a second total electric power level which does not exceed said first total electric power level in said transponder, each of said first and said second predetermined numbers being representative of the number of down link carrier waves directed from said satellite to said earth stations, each of the down link carrier waves directed from said satellite towards said earth stations;

at least one of said earth stations having a receiving end which is accessible to a plurality of said down link carrier waves by frequency hopping.

9. A time division multiple access system as claimed in claim 8, wherein at least a part of said individual electric power levels is determined by said burst time plan which is delivered to the earth stations related to said part of the individual electric power levels.

10. A time division multiple access system as claimed in claim 8, wherein at least a part of said individual electric power levels is determined by information sent from the earth stations related to said part of the individual electric power levels.

11. A time division multiple access system as claimed in claim 8, said up link carrier waves conveying a plurality of transmission signals having different contents from one of said transmission signals to another of said transmission signals, wherein at least a part of said individual electric power levels is determined in accordance with said contents.

12. A time division multiple access system as claimed in claim 8, each of said earth stations comprising generating means responsive to an internal control signal for generating an internal carrier wave determined by said internal control signal, modulating means responsive to said internal carrier wave and information to be conveyed for modulating said internal carrier wave by said information to produce a modulated signal, sending means coupled to said modulating means for sending said modulated signal towards said satellite as one of said up link carrier waves that is divisible into a succession of time division multiple access frames, memory means for memorizing said burst time plan to produce first and second time plan data signals, and means for supplying said first time plan data signal to said generating means as said internal control signal, wherein each of said earth stations further comprises:

control signal producing means responsive to said second time plan data signal for producing an attenuation control signal which represents an amount of attenuation and is variable within a period of said time division multiple access frames;

said sending means in each of said earth stations comprising:

attenuating means coupled to said control signal producing means and said modulating means for attenuating said modulated signal in dependency upon said attenuation control signal into an attenuated signal; and means for producing said attenuated signal as one of said up link carrier waves.

13. A time division multiple access system as claimed in claim 12, said second time plan data signal specifying one of destined earth stations, wherein said control signal producing means comprises:

memory circuit means coupled to said memory means for memorizing a relationship between said destined earth stations and attenuation amounts assigned to said destined earth stations, respectively, to produce a selected one of said attenuation amounts as said attenuation control signal in response to said second time plan data signal.

14. A time division multiple access system as claimed in claim 12, said second time plan data signal representing one of burst identification signals preassigned to transmission bursts to be sent through one of said carrier waves, wherein said control signal producing means comprises:

memory circuit means coupled to said memory means for memorizing a relationship between said burst identification signals and attenuation amounts assigned to said transmission bursts, to produce a selected one of said attenuation amounts as said attenuation control signal in response to said second time plan data signal.

15. A time division multiple access system as claimed in claim 12, said second time plan data signal specifying one of said up link carrier waves, wherein said control signal producing means comprises:

memory circuit means coupled to said memory means for memorizing a relationship between said up link carrier waves and attenuation amounts assigned to said up link carrier waves to produce a selected one of said attenuation amounts as said attenuation control signal in response to said second time plan data signal.

16. A time division multiple access system as claimed in claim 8, each of said first and said second predetermined numbers being also defined in relation to the number of down link carrier waves directed from said satellite towards said earth stations, said at least one of the earth stations receiving said plurality of the carrier waves in the time division fashion by carrying out said frequency hopping, wherein said receiving end comprises:

memorizing means for memorizing said burst time plan to produce a first reception time plan signal representative of said down link carrier waves and a second reception time plan signal representative of amounts of attenuation determined in relation to the respective down link carrier waves, respectively;

attenuating means responsive to said second reception time plan signal for attenuating each of said down link carrier waves into an attenuated signal;

receiving means coupled to said attenuating means and said memorizing means for receiving said attenuated signal by carrying out said frequency hopping in accordance with said first reception time plan signal to receive each of said down link carrier waves.

17. A time division multiple access system as claimed in claim 8, said earth stations having reception conditions which are different from one another and which are fixed for said earth stations, respectively, wherein said up link carrier waves have individual and fixed electric power levels which are determined in consideration of said reception conditions so that the second total electric power level does not exceed said first total electric power level on said satellite.

18. A time division multiple access system as claimed in claim 8, said earth stations having reception conditions which are different from one another and which are variable with time, wherein said up link carrier waves have individual electric power levels which are determined in consideration of said reception conditions measured at and informed from an associated one of said earth stations so that the second total electric power level does not exceed said first total electric level on said satellite.

* * * * *